[12] United States Patent
Stephen et al.

(10) Patent No.: US 10,521,511 B2
(45) Date of Patent: Dec. 31, 2019

(54) TEXT CONVERSION AND REPRESENTATION SYSTEM

(75) Inventors: Christopher Colin Stephen, Paddington (AU); Ann Elizabeth Fitts, Sacramento, CA (US)

(73) Assignee: Accessible Publishing Systems Pty Ltd, Surry Hills (AU)

( * ) Notice: Subject to any disclaimer, the term of this patent is extended or adjusted under 35 U.S.C. 154(b) by 0 days.

(21) Appl. No.: 13/991,149

(22) PCT Filed: Dec. 2, 2011

(86) PCT No.: PCT/AU2011/001572
§ 371 (c)(1),
(2), (4) Date: May 31, 2013

(87) PCT Pub. No.: WO2012/071630
PCT Pub. Date: Jun. 7, 2012

(65) Prior Publication Data
US 2013/0253903 A1    Sep. 26, 2013

(30) Foreign Application Priority Data
Dec. 2, 2010   (AU) ................................ 2010905304

(51) Int. Cl.
G06F 17/28   (2006.01)
G06F 17/27   (2006.01)
G09B 19/06   (2006.01)
G06F 17/22   (2006.01)
G10L 13/08   (2013.01)

(52) U.S. Cl.
CPC .......... *G06F 17/28* (2013.01); *G06F 17/2217* (2013.01); *G06F 17/27* (2013.01); *G06F 17/289* (2013.01); *G09B 19/06* (2013.01); *G10L 13/08* (2013.01)

(58) Field of Classification Search
None
See application file for complete search history.

(56) References Cited

U.S. PATENT DOCUMENTS 4,193,212 A   3/1980   Al-Kufaishi
4,713,008 A   12/1987  Stocker et al.
(Continued)

OTHER PUBLICATIONS

Webpage (UCL "The International Phonetic Alphabet in Unicode" (Mar. 25, 2010 version) http://www.phon.ucl.ac.uk/home/wells/ipa-unicode.htm.*
(Continued)

*Primary Examiner* — Pierre Louis Desir
*Assistant Examiner* — Yi Sheng Wang
(74) *Attorney, Agent, or Firm* — Stoel Rives LLP

(57) ABSTRACT

Disclosed is a method of phonetically encoding a text document. The method comprises providing, for a current word in the text document, a phonetically equivalent encoded word comprising one or more syllables, each syllable comprising a sequence of phonemes from a predetermined phoneme set, the sequence being phonetically equivalent to the corresponding syllable in the current word, and adding the phonetically equivalent encoded word or the current word at a current position in the phonetically encoded document. Each phoneme in the phoneme set is associated with a base grapheme that is pronounced as the phoneme in one or more English words.

18 Claims, 14 Drawing Sheets

(56) References Cited

U.S. PATENT DOCUMENTS

| | | | |
|---|---|---|---|
| 5,057,020 A | 10/1991 | Cytanovich | |
| 6,077,080 A * | 6/2000 | Rai | G09B 1/00 |
| | | | 434/159 |
| 6,088,673 A * | 7/2000 | Lee | G10L 13/00 |
| | | | 704/260 |
| 6,108,627 A | 8/2000 | Sabourin | |
| 6,322,367 B1 * | 11/2001 | Marshall | G09B 1/02 |
| | | | 434/167 |
| 6,474,992 B2 * | 11/2002 | Marshall | G09B 1/02 |
| | | | 434/167 |
| 6,829,580 B1 * | 12/2004 | Jones | G06F 17/2755 |
| | | | 704/10 |
| 7,277,851 B1 | 10/2007 | Henton | |
| 9,430,555 B2 | 8/2016 | Duncan et al. | |
| 2004/0191731 A1 * | 9/2004 | Stork | G09B 21/001 |
| | | | 434/180 |
| 2005/0102143 A1 | 5/2005 | Woodward | |
| 2006/0088805 A1 | 4/2006 | Pitkethly | |
| 2006/0217966 A1 * | 9/2006 | Hu | G10L 25/00 |
| | | | 704/200 |
| 2008/0082335 A1 | 4/2008 | Engelsen | |
| 2008/0140398 A1 * | 6/2008 | Shpigel | G10L 15/26 |
| | | | 704/235 |
| 2009/0319275 A1 * | 12/2009 | Noda | G10L 13/08 |
| | | | 704/266 |

OTHER PUBLICATIONS

International Search Report dated Jan. 16, 2012, 3 pages.
Lehtonen et al., "A Dynamic User Interface for Document Assembly," *DocEng '02*, Nov. 8-9, 2002, 8 pp.

* cited by examiner

|   | 1 | 2 | 3 | 4 | 5 | 6 | 7 | 8 | 9 |
|---|---|---|---|---|---|---|---|---|---|
| a | a | ā | ă | a˙ |   | å | á̊ |   | a̶ |
| e | e | ē | ĕ | ė | ë | é |   |   | e̶ |
| i | i | ī | ĭ |   |   | í̈ |   |   | i̶ |
| o | o | ō | ŏ | ó | ö | õ |   |   | o̶ |
| u | u | ū |   | u˙ | ü | ũ | ű |   | u̶ |
| y |   | ȳ | y̆ | ŷ |   | ÿ |   |   | y̶ |
| b | b |   |   |   |   |   |   |   | b̶ |
| c | c | ç | ĉ |   |   |   |   |   | c̶ |
| d | d |   |   |   |   |   |   |   | d̶ |
| f | f | f̌ |   |   |   |   |   |   | f̶ |
| g | g | ġ |   |   |   |   |   |   | g̶ |
| h | h | h̲ |   |   |   |   |   |   | h̶ |
| j | j |   |   |   |   |   |   |   | j̶ |
| k | k |   |   |   |   |   |   |   | k̶ |
| l | l |   |   |   |   |   |   |   | l̶ |
| m | m |   |   |   |   |   |   |   | m̶ |
| n | n |   |   |   |   |   |   |   | n̶ |
| p | p |   |   |   |   |   |   |   | p̶ |
| q | q |   |   |   |   |   |   |   | q̶ |
| r | r |   |   |   |   |   |   |   | r̶ |
| s | s | ş | ŝ | ş̂ |   |   |   |   | s̶ |
| t | t | t̲ | t̂ |   |   |   |   |   | t̶ |
| v | v |   |   |   |   |   |   |   | v̶ |
| w | w |   |   |   |   |   |   |   | w̶ |
| x | x |   |   |   |   |   |   |   | x̶ |
| y | y |   |   |   |   |   |   |   | y̶ |
| z | z |   |   |   |   |   |   |   | z̶ |

Table 7: Default representations of RE phonemes

Fig. 11

TEXT CONVERSION AND REPRESENTATION SYSTEM

This application is the National Phase of International Application No. PCT/AU2011/001572, filed Dec. 2, 2011, which claims priority to the Australian Patent Application No. 2010905304, filed Dec. 2, 2010, the disclosures of which are incorporated by reference herein.

TECHNICAL FIELD

The present invention relates generally to text conversion and representation and, in particular, to systems and methods for converting English text to formats adapted to aid legibility.

BACKGROUND

Reading is an indispensable skill in modern life. The ability to mentally convert written text into meaning allows people separated in place or time to communicate efficiently with each other. Unlike speech, which is a "natural" ability that almost everyone develops early in life without the need for instruction, literacy is a skill of relatively recent development that must be intensively taught.

In an alphabetic language such as English, text characters represent phonemes, the basic units of spoken sound. Phonemes make up syllables, which in turn make up words, and words are grouped into phrases and sentences that contain meaning. The first step in reading an alphabetic language is phonological, and involves decoding text characters into phonemes. The phonemes are grouped into syllables and the syllables into words. Once this decoding and grouping is accomplished, the reader internally "hears" each word. This activates the speech-understanding portions of the brain to obtain the meaning of the words and thereby understand the sentences that comprise them. The ability to decode text characters into phonemes is labelled "phonemic awareness". Studies have shown that approximately twenty percent of people across all language groups have difficulty in developing phonemic awareness when learning to read, mostly for reasons related to brain functioning. As readers become more proficient, they start to recognise whole words, and even phrases, by shape, a function known as "sight word recognition" that involves the visual processing parts of the brain and enables fluency in reading. Developing phonemic awareness allows people to practice reading by themselves and develop sight word recognition without needing to hear an unfamiliar word pronounced externally. Most learners develop sight word recognition after successfully decoding a word five times (some need to see it more than ten times). Practice is therefore essential for developing sight word recognition.

The English language presents particular problems to would-be readers because it has, for historical reasons, relatively poor phonemic orthography, that is, correspondence between how words are spelled and how they are spoken. There is a two-way ambiguity in English orthography. Firstly, many phonemes can be spelled more than one way (for example the long—"e" sound in the word "me" can be spelled as "e", "ey", "ee", "ei", "ea", "y", or "ie"). This ambiguity is referred to as homophonic ambiguity, as it gives rise to homophones—words that are pronounced the same but are spelled differently (e.g. "steel" and "steal"). Secondly, many characters and character combinations (or "graphemes") represent multiple phonemes. For example, the grapheme "a", in addition to representing its "basic" phoneme, i.e. the phoneme as which the grapheme is most frequently pronounced (the short "a" sound in "at"), represents at least three other phonemes (as in "ate", "wash", and "about"). This is referred to as homographic ambiguity, as it gives rise to homographs—words that are spelled the same but pronounced differently (e.g. "bow" to rhyme with "cow", and "bow" to rhyme with "show"). It is homographic ambiguity that presents difficulties to would-be readers. By some estimates, more than half of the words in any passage of standard English text are non-phonetic, in the sense that they involve graphemes representing phonemes other than their basic phonemes. This fraction is even greater for proper names, for example "Cholmondeley", which is pronounced "Chumley". Even proficient readers struggle to phonetically decode unfamiliar proper names correctly. To learn to read such words correctly, a would-be reader can attempt to learn an often inconsistent, and invariably incomplete, set of rules as to how phonemes vary according to context. Alternatively, they can jump straight to the "sight word recognition" stage of reading. Either of these tasks is laborious for most people, particularly so for adults. If the would-be reader does not already know the sound and meaning of the word, the task of phonetic decoding is made more difficult. Therefore, even children or adults with normal phonemic awareness, but who have smaller vocabularies than those from higher-education backgrounds, will struggle with phonetic decoding of anything other than the simplest standard English text.

English is also unusual in that the number of people who speak, but cannot read or write, English in some form as a second language vastly exceeds the number of native speakers. There is also a large class of people, particularly in Asian countries, who can understand written English, but cannot pronounce it. Such people are relying solely on sight word recognition, as they would do in their native, pictographic languages.

There is thus a large number of adults who could benefit from assistance in learning to phonetically decode English, in addition to children of native speakers.

There have been many attempts to reform English spelling to reduce the ambiguities and thereby make written English more phonetic. They fall into two basic categories: those that operate within the existing Roman alphabet, and those that introduce new characters, or variants of existing characters. None of these proposals has ever been widely adopted, for a variety of reasons. Those that operate within the existing alphabet tend not be able to reduce the ambiguities sufficiently to make the reform effort worthwhile, while those that do not involve substantial adaptation costs. Moreover, teaching new readers to read using previous versions of reformed English renders standard English text, which will always predominate, more difficult to read for those readers.

The advent of electronic publishing has made the distribution of documents, particularly books, in customised formats economically feasible. Where previously "special formats" to aid reading by people with reading difficulties of all kinds were limited to large-print books, it is now possible to prepare and distribute books and other documents in a large variety of legibility-aiding formats to suit all kinds of reading difficulties. Examples of such formats include shorter lines, larger line spacing, grading of font sizes over words and lines, eye-tracking guidelines, and many others. However, such formats have not catered to the specific reading difficulty of poor phonemic awareness, or to the needs of adult non-native English speakers.

SUMMARY

It is an object of the present invention to substantially overcome, or at least ameliorate, one or more disadvantages of existing arrangements.

Disclosed are methods and devices for encoding standard English (SE) text in a format, known as Readable English (RE), that is adapted, when rendered to human-readable form, to aid legibility for would-be readers. Rendered RE, by default, substantially preserves the overall shape or spelling of the original SE to which it is phonetically equivalent. Consequently, over time, readers of default-rendered RE develop "sight word recognition" of non-phonetic words and can therefore recognise the equivalent SE words, which have substantially the same shape. In this way, default-rendered RE acts as an intermediate format adapted to assist people to learn to read SE text. In addition, proficient readers of SE can easily read default-rendered RE, because the similarity in shape of default-rendered RE words to the familiar, equivalent SE words allows their sight-word recognition skills to work effectively.

For readers who speak foreign languages, the RE sounds may be represented in the native language of the reader using a table of mappings of RE sounds to equivalent or near-equivalent sounds in that language, in order to aid the learning of the pronunciation of English.

According to a first aspect of the present disclosure, there is provided a method of phonetically encoding a text document. The method comprises providing, for a current word in the text document, a phonetically equivalent encoded word comprising one or more syllables, each syllable comprising a sequence of phonemes from a predetermined phoneme set, the sequence being phonetically equivalent to the corresponding syllable in the current word, and adding the phonetically equivalent encoded word or the current word at a current position in the phonetically encoded document. Each phoneme in the phoneme set is associated with a base grapheme that is pronounced as the phoneme in one or more English words.

DESCRIPTION OF THE DRAWINGS

At least one embodiment of the present invention will now be described with reference to the drawings and appendices, in which:

FIG. 11 illustrates Table 7, which contains default representations of RE phonemes.

Appendix A contains a fragment of an RE-encoded XML document; and

Figure 6:
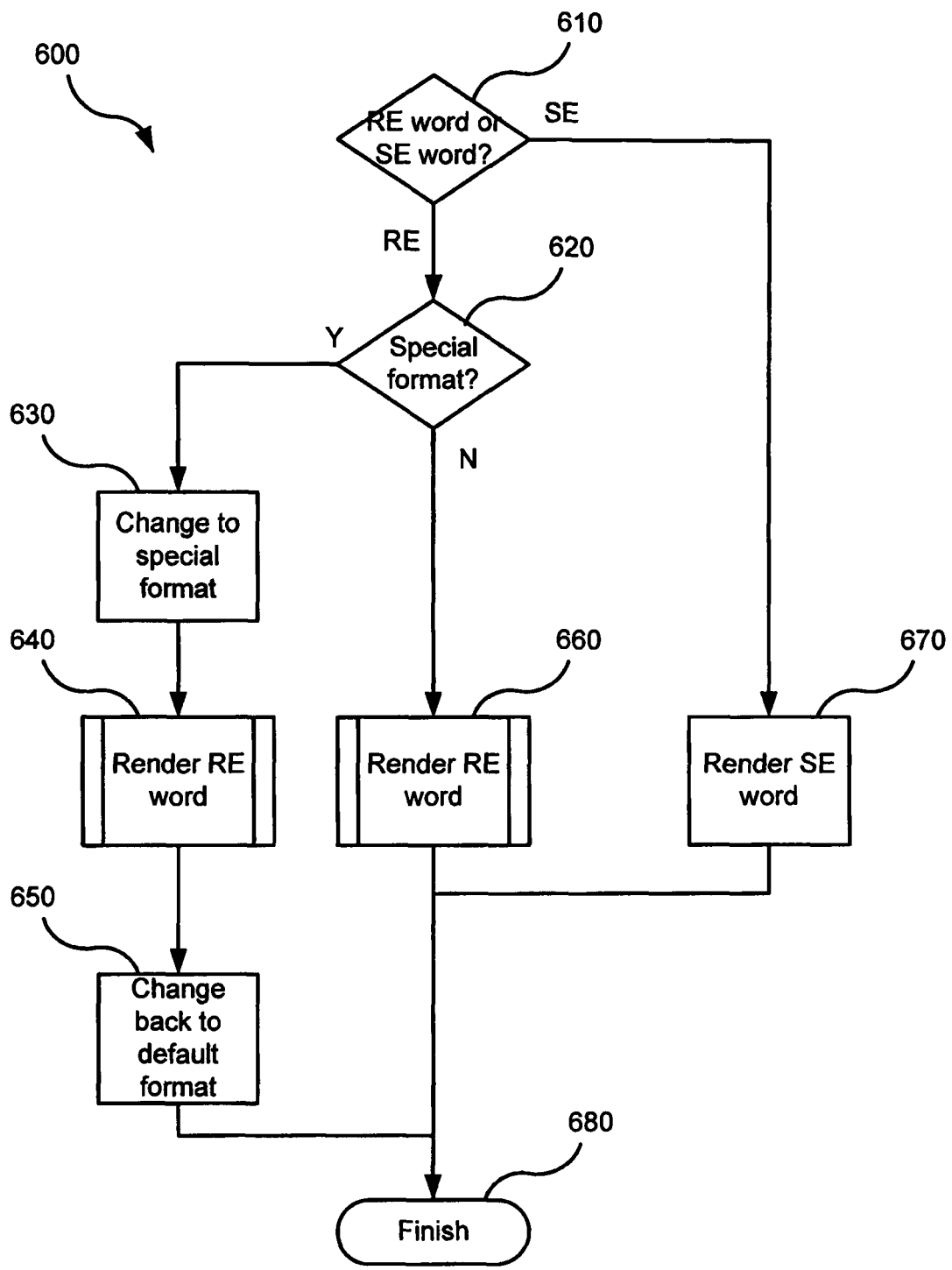
FIG. 6 is a flow chart representing a method of rendering an RE-encoded document, as used in the method of FIG. 1.

Appendix B contains a sample of RE rendered using the method of FIG. 6.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

Figure 1:
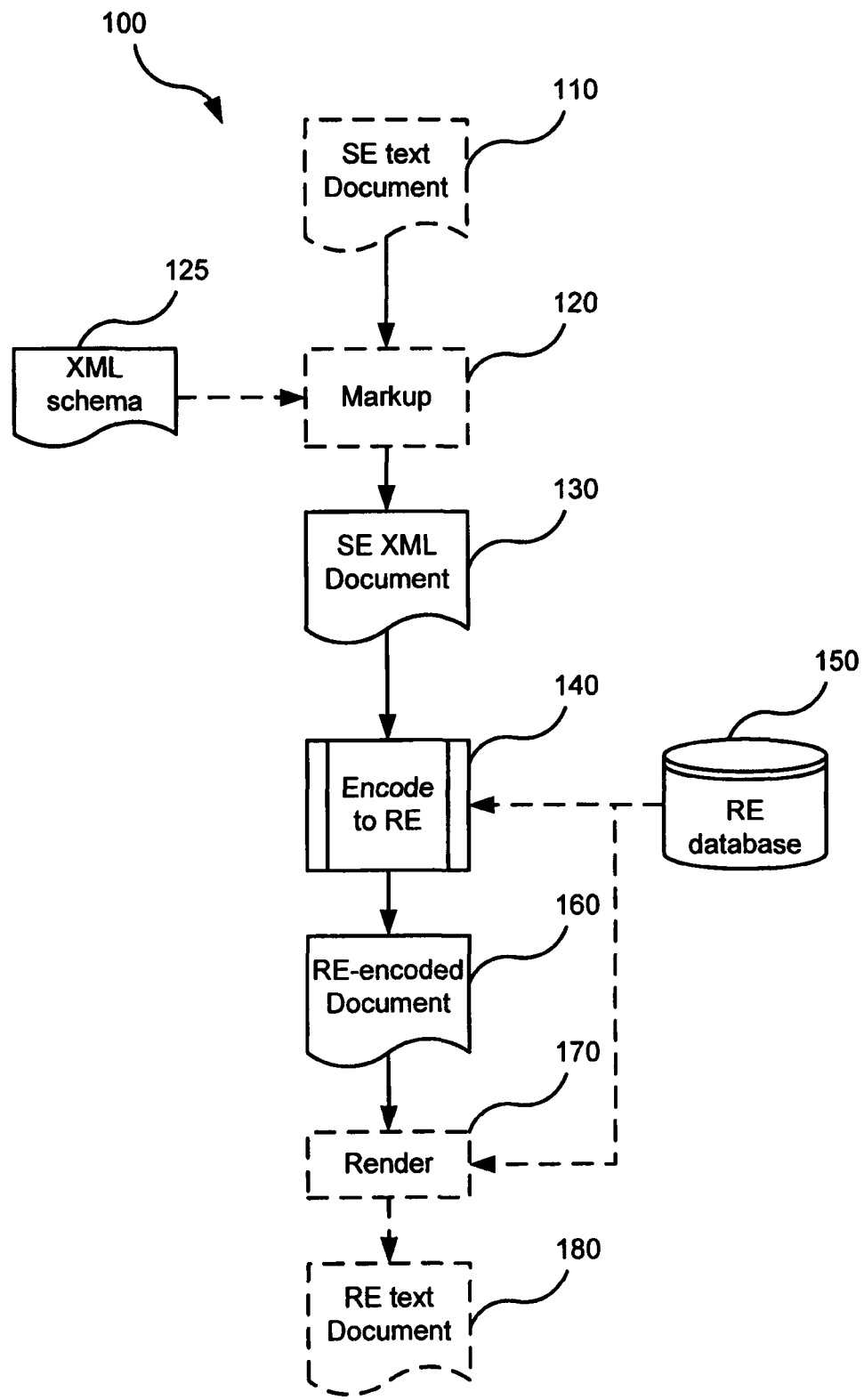
FIG. 1 is a flow chart illustrating a method of converting a text document in Standard English (SE) into a Readable English (RE) text document.

FIG. 1 is a flow chart illustrating a method 100 of converting a text document in Standard English (SE) into a Readable English (RE) text document. The method 100 is described in detail below.

Figure 2A:
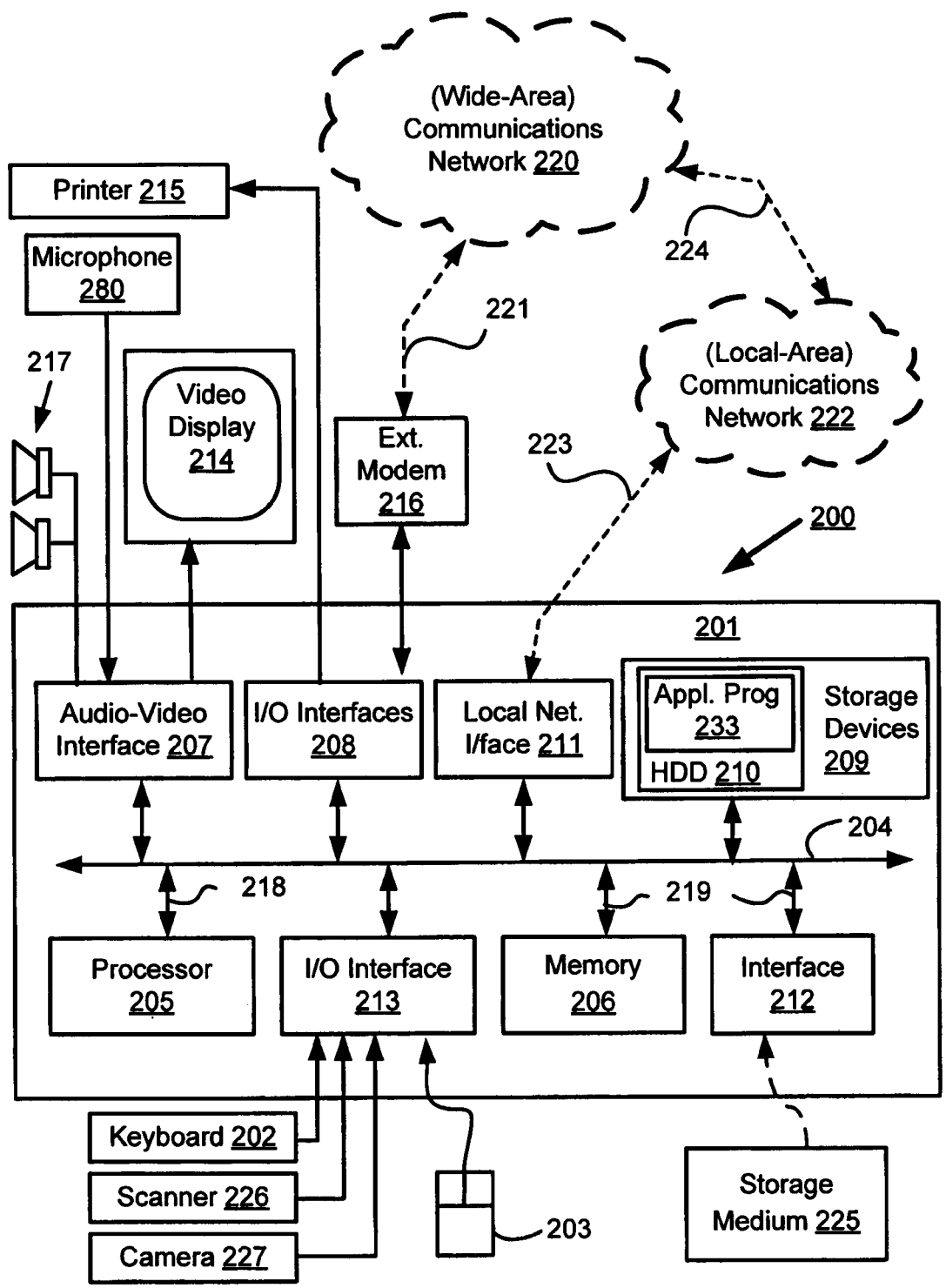
FIGS. 2A and 2B collectively form a schematic block diagram of a general purpose computer system upon which the method of FIG. 1 may be practised.
Figure 2B:
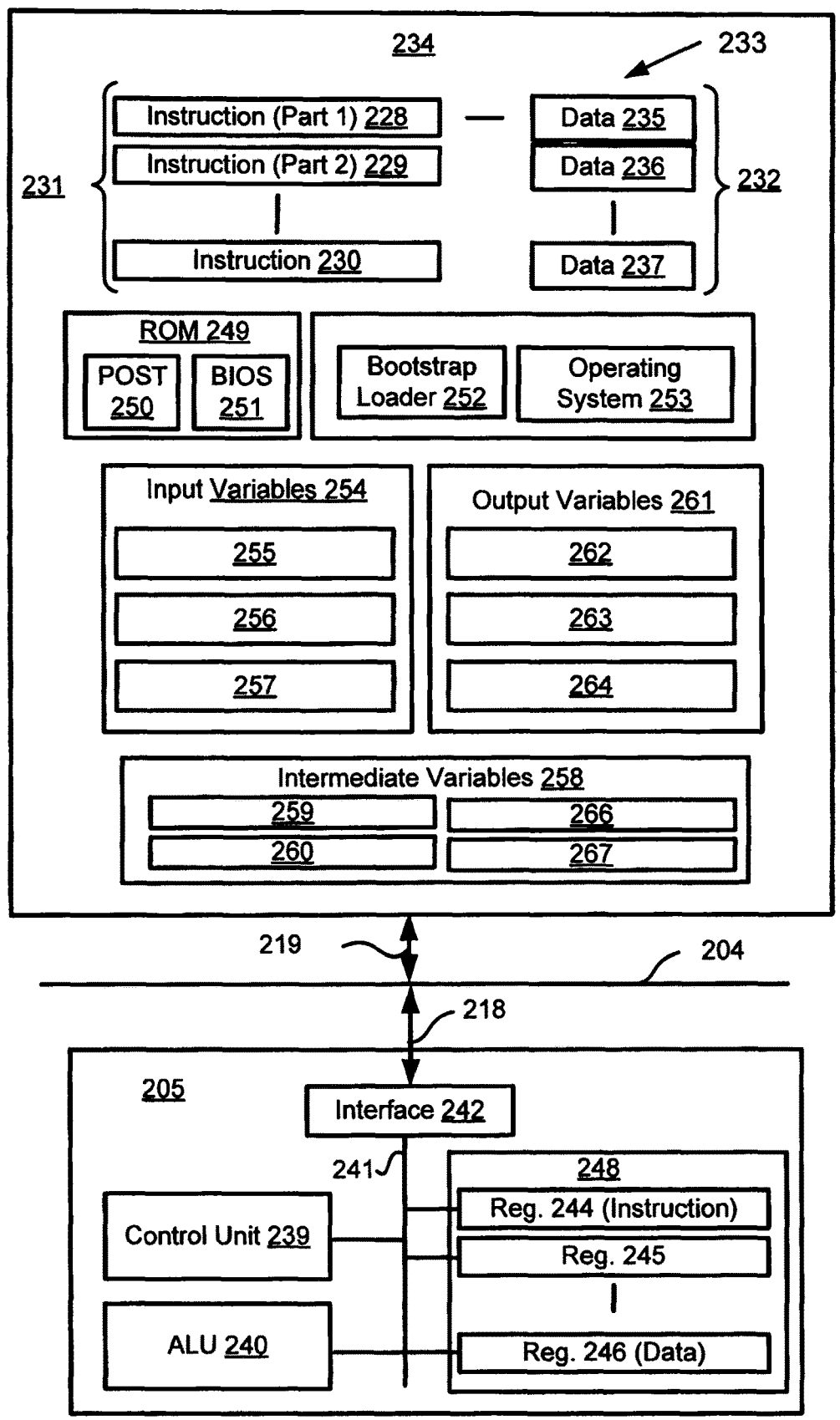

FIGS. 2A and 2B collectively form a schematic block diagram of a general purpose computer system 200, upon which the method 100 may be practised. As seen in FIG. 2A, the computer system 200 is formed by a computer module 201, input devices such as a keyboard 202, a mouse pointer device 203, a scanner 226, a camera 227, and a microphone 280, and output devices including a printer 215, a display device 214 and loudspeakers 217. An external Modulator-Demodulator (Modem) transceiver device 216 may be used by the computer module 201 for communicating to and from a communications network 220 via a connection 221. The network 220 may be a wide-area network (WAN), such as the Internet or a private WAN. Where the connection 221 is a telephone line, the modem 216 may be a traditional "dial-up" modem. Alternatively, where the connection 221 is a high capacity (e.g. cable) connection, the modem 216 may be a broadband modem. A wireless modem may also be used for wireless connection to the network 220.

The computer module 201 typically includes at least one processor unit 205, and a memory unit 206 for example formed from semiconductor random access memory (RAM) and semiconductor read only memory (ROM). The module 201 also includes an number of input/output (I/O) interfaces including an audio-video interface 207 that couples to the video display 214, loudspeakers 217 and microphone 280, an I/O interface 213 for the keyboard 202, mouse 203, scanner 226, camera 227 and optionally a joystick (not illustrated), and an interface 208 for the external modem 216 and printer 215. In some implementations, the modem 216 may be incorporated within the computer module 201, for example within the interface 208. The computer module 201 also has a local network interface 211 which, via a connection 223, permits coupling of the computer system 200 to a local computer network 222, known as a Local Area Network (LAN). As also illustrated, the local network 222 may also couple to the wide network 220 via a connection 224, which would typically include a so-called "firewall" device or device of similar functionality. The interface 211 may be formed by an Ethernet™ circuit card, a Bluetooth™ wireless arrangement or an IEEE 802.11 wireless arrangement.

The interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An interface 212 is typically provided to interface with an external non-volatile source of data. A portable computer readable storage device 225, such as optical disks (e.g. CD-ROM, DVD), USB-RAM, and floppy disks for example may then be used as appropriate sources of data to the system 200.

The components 205 to 213 of the computer module 201 typically communicate via an interconnected bus 204 and in a manner which results in a conventional mode of operation of the computer system 200 known to those in the relevant art. Examples of computers on which the described arrangements can be practised include IBM-PCs and compatibles, Sun SPARCstations, Apple Macs™ or computer systems evolved therefrom, such as notebook, tablet, and mobile "smartphone" systems.

The method 100 may be implemented using the computer system 200 as one or more software application programs 233 executable within the computer system 200. In particular, with reference to FIG. 2B, the steps of the method 100 are effected by instructions 231 in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and a user.

The software 233 is generally loaded into the computer system 200 from a computer readable medium, and is then typically stored in the HDD 210, as illustrated in FIG. 2A, or the memory 206, after which the software 233 can be executed by the computer system 200. In some instances, the application programs 233 may be supplied to the user encoded on one or more storage media 225 and read via the corresponding interface 212 prior to storage in the memory 210 or 206. Computer readable storage media refers to any non-transitory tangible storage medium that participates in providing instructions and/or data to the computer system 200 for execution and/or processing. Examples of such storage media include floppy disks, magnetic tape, CD-ROM, DVD, a hard disk drive, a ROM or integrated circuit, USB memory, a magneto-optical disk, semiconductor memory, or a computer readable card such as a PCMCIA card and the like, whether or not such devices are internal or external to the computer module 201. A computer readable storage medium 225 having such software or computer program recorded on it is a computer program product. The use of such a computer program product in the computer module 201 effects an apparatus for converting a text document.

Alternatively the software 233 may be read by the computer system 200 from the networks 220 or 222 or loaded into the computer system 200 from other computer readable media. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory devices (including the HDD 210 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206. A program permanently stored in a hardware device such as the ROM 249 is sometimes referred to as firmware. The POST program 250 examines hardware within the computer module 201 to ensure proper functioning, and typically checks the processor 205, the memory (209, 206), and a basic input-output systems software (BIOS) module 251, also typically stored in the ROM 249, for correct operation. Once the POST program 250 has run successfully, the BIOS 251 activates the hard disk drive 210. Activation of the hard disk drive 210 causes a bootstrap loader program 252 that is resident on the hard disk drive 210 to execute via the processor 205. This loads an operating system 253 into the RAM memory 206 upon which the operating system 253 commences operation. The operating system 253 is a system level application, executable by the processor 205, to fulfil various high level functions, including processor management, memory management, device management, storage management, software application interface, and generic user interface.

The operating system 253 manages the memory (209, 206) in order to ensure that each process or application running on the computer module 201 has sufficient memory in which to execute without colliding with memory allocated to another process. Furthermore, the different types of memory available in the system 200 must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

The processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal buses 241 functionally interconnect these functional modules. The processor 205 typically also has one or more interfaces 242 for communicating with external devices via the system bus 204, using a connection 218.

The application program 233 includes a sequence of instructions 231 that may include conditional branch and loop instructions. The program 233 may also include data 232 which is used in execution of the program 233. The instructions 231 and the data 232 are stored in memory locations 228-230 and 235-237 respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228-229.

In general, the processor 205 is given a set of instructions which are executed therein. The processor 205 then waits for a subsequent input, to which it reacts to by executing another set of instructions. Each input may be provided from one or more of a number of sources, including data generated by one or more of the input devices 202, 203, data received from an external source across one of the networks 220, 222, data retrieved from one of the storage devices 206, 209 or data retrieved from a storage medium 225 inserted into the corresponding interface 212. The execution of a set of the instructions may in some cases result in output of data. Execution may also involve storing data or variables to the memory 234.

The disclosed methods use input variables 254, that are stored in the memory 234 in corresponding memory locations 255-258. The disclosed methods produce output variables 261, that are stored in the memory 234 in corresponding memory locations 262-265. Intermediate variables may be stored in memory locations 259, 260, 266 and 267.

The register section 244-246, the arithmetic logic unit (ALU) 240, and the control unit 239 of the processor 205 work together to perform sequences of micro-operations needed to perform "fetch, decode, and execute" cycles for every instruction in the instruction set making up the program 233. Each fetch, decode, and execute cycle comprises:
(a) a fetch operation, which fetches or reads an instruction 231 from a memory location 228;
(b) a decode operation in which the control unit 239 determines which instruction has been fetched; and
(c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the method 100 of FIG. 1 is associated with one or more segments of the program 233, and is performed by the register section 244-247, the ALU 240, and the control unit 239 in the processor 205 working together to perform the fetch, decode, and execute cycles for every instruction in the instruction set for the noted segments of the program 233.

The method 100 of FIG. 1 may alternatively be implemented in dedicated hardware such as one or more integrated circuits performing the functions or sub functions of the method 100. Such dedicated hardware may include graphic processors, digital signal processors, or one or more microprocessors and associated memories.

The method 100 operates on a "source" document 110 in Standard English (SE) text. The source document is in electronic or printed form. A markup process 120 is applied to the SE text document to convert the SE text document to an SE document 130 in XML format. If the source document is in printed form, or in unstructured electronic form such as ASCII text, the markup process 120 is performed according to an XML schema 125 that makes explicit the implicit structural information contained in the source document 110. For example, section headings are explicitly tagged as such in the SE XML document 130. Paragraphs are explicitly tagged as such in the SE XML document 130 as well. If the source document 110 is in structured electronic form, such as an electronic book (e-book), the markup process is also performed according to the XML schema 125 to ensure the SE XML document 130 is in the form expected by the encoding process 140. In either case, the SE XML document 130 makes each SE word in the source document 110 individually identifiable.

Next, an encoding process 140 encodes the SE XML document 130 to an RE-encoded document 160. In one implementation, the RE-encoded document 160 is also in XML format. The encoding process 140 refers to a RE database 150. The RE database 150 is typically stored in the hard disk drive memory 210 of the computing system 210 carrying out the method 100. Alternatively, the RE database 150 is stored in the hard disk drive memory of a different computing system, and the computing system 210 carrying out the method 100 accesses the RE database 150 via the network connection 220 or 222 according to conventional protocols for querying a database over a network.

Both the encoding process 140 and the RE database 150 will be described in detail below. The structural and punctuation information in the SE XML document 130 are preserved by the encoding process 140 in the RE-encoded document 160.

In an alternative implementation of the method 100, the source document 110 is already in the expected SE XML format, so the markup process 120 is not performed, which is why the markup process 120 is represented in dashed outline in FIG. 1. In this alternative, the encoding process 140 acts directly on the source document 110.

In an optional step 170, represented in dashed outline in FIG. 1, the RE-encoded document 160 is rendered to a rendered RE document 180 that is in human readable form. The rendering step 170, described in more detail below, also refers to the RE database 150. The structural and punctuation information in the RE-encoded document 160 are substantially preserved by the rendering process 170 in the rendered RE document 180. The principal difference between the source SE and the rendered RE is in the representation of the words.

In one implementation, the rendering step 170 has access to the SE source document 110, and the rendering step 170 renders the RE-encoded document 160 interleaved with the SE source document 110. The interleaving could be by page, or by line with the rendered RE words vertically aligned with the corresponding SE words. Using line interleaving, a reader can readily locate the rendered RE word corresponding to any SE word in the SE source document 110.

Figure 3:
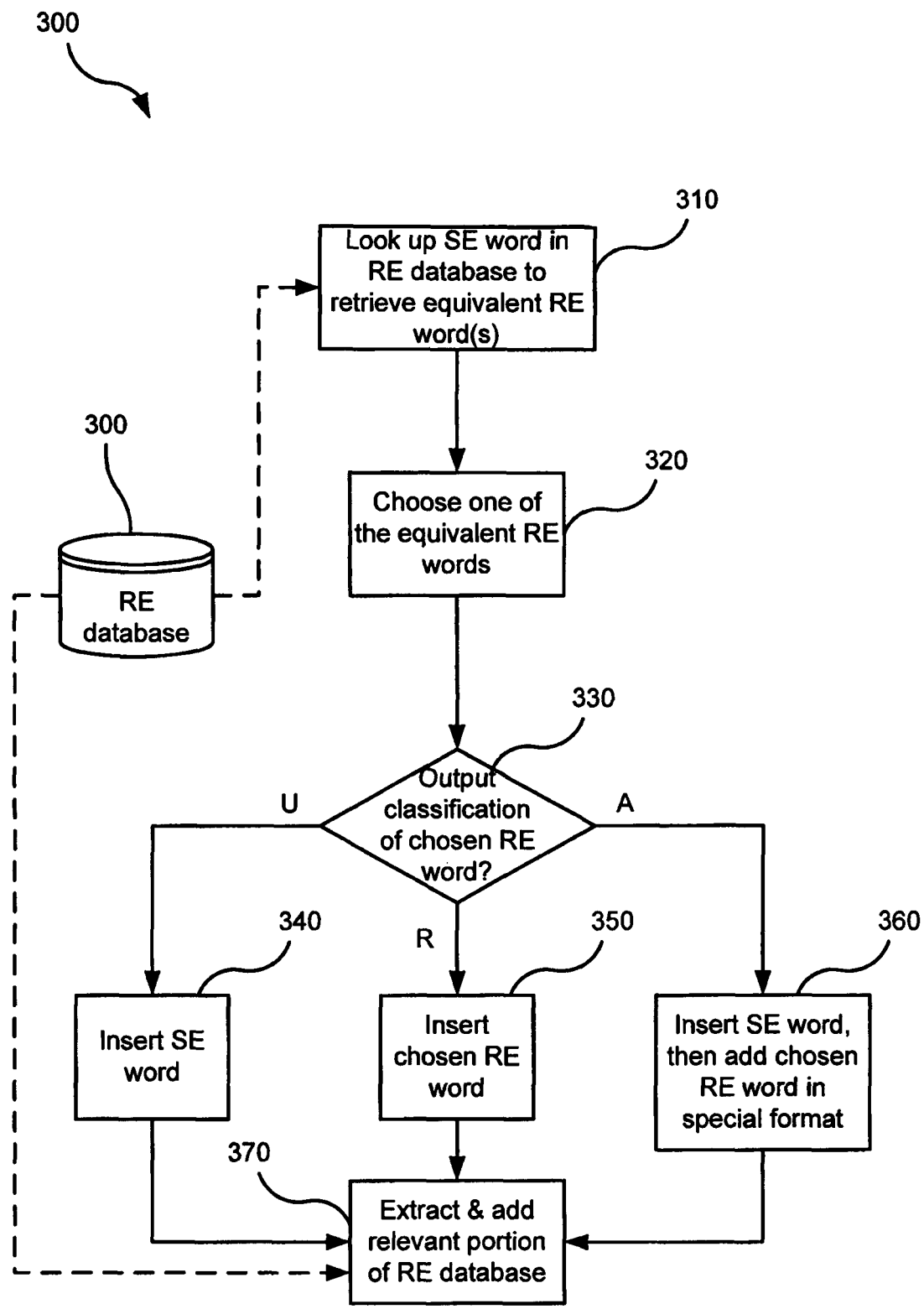
FIG. 3 is a flow chart illustrating a method of encoding an SE XML document to an RE-encoded document, as used in the method of FIG. 1.

FIG. 3 is a flow chart illustrating a method 300 of encoding an SE XML document, e.g. the SE XML document 130, to an RE-encoded document, as used in step 140 of the method 100 of FIG. 1. The method 300 is carried out for each successive word in the SE XML document. For a current SE word in the SE document, the method 300 starts at step 310, which looks up the current SE word in the RE database 150 to retrieve its equivalent RE word(s). As described in detail below, if the current SE word has one or more homographs, the RE database 150 contains more than one equivalent RE word for the current SE word. The step 320 chooses the correct one of the retrieved equivalent RE words based on the characteristics of the current SE word, the characteristics of the retrieved equivalent RE words, e.g. their parts of speech (noun, verb etc.), and the context of the current SE word. For example, if the word preceding the current SE word is "to", the retrieved equivalent RE word that is a verb is chosen. Alternatively, if the preceding SE word is an article or an adjective, the retrieved equivalent RE word that is a noun is chosen. In one implementation, step 320 invokes a set of rules, such as the rules mentioned above based on parts of speech and context, to choose the correct retrieved equivalent RE word for the context. The rules are inferred from numerous previous choices made manually at step 320 by a human operator.

In an alternative implementation, step 320 invokes the set of rules to rank the retrieved equivalent RE words in order of their likely correctness for the context, rather than to choose one. The remaining steps 330, 340, 350, 360, 370 are then carried out for each retrieved equivalent RE word in order of their likely correctness for the context. In this implementation, all the equivalent RE words are encoded in the output RE-encoded document in that order. On rendering, all the equivalent RE words would be presented to the reader to choose between the alternative renderings based on their knowledge of spoken English, or their meanings in their native language. More details of the rendering process are given below.

If the current SE word has no homographs, only one equivalent RE word is retrieved in step 310, so step 320 has nothing to do.

The next step 330 examines the output classification of the chosen RE word, which was also retrieved from the RE database 150 in the step 310. The method 300 then proceeds to one of steps 340, 350, and 360 depending on the output classification of the chosen RE word. If the output classification is "U", step 340 inserts the current SE word, tagged as an unencoded SE word, into the current position in the output RE-encoded document. If the output classification is "R", the step 350 inserts the chosen RE word into the current position in the output RE-encoded document. If the output classification is "A", the step 360 inserts the current SE word, tagged as an unencoded SE word, into the current position in the output RE-encoded document, followed by the chosen RE word, tagged with a "special" format to be used when the output RE-encoded document 160 is rendered to human readable form 180 (e.g. by the rendering step 170). The three output classifications are explained in detail below.

The method 300 concludes at step 370, in which portions relevant to the chosen RE word (if it has not previously been encountered in the document) are extracted from the RE database 150 and included in the output RE-encoded document 160. The nature of the relevant portions, referred to herein as supplementary information, of the RE database 150 included in the RE-encoded document at step 370 is described in detail below. An RE-encoded document 160 containing the supplementary information is referred to herein as an "enhanced" RE-encoded document 160.

In an alternative implementation of the method 300, step 370 is not carried out, so the resulting RE-encoded document 160 contains no supplementary information, and is referred to as a "basic" RE-encoded document 160.

An "enhancement" process is adapted to add supplementary information to a basic RE-encoded document to produce an enhanced RE-encoded document 160. In the enhancement process, the supplementary information relevant to each unique RE-encoded word in the basic RE-encoded document 160 is extracted from the RE database 150 and appended to the basic RE-encoded document 160 to produce the enhanced RE-encoded document.

An alternative method to the conversion method 100 is carried out to produce a rendered RE document 180 directly from an SE source document 110, without an intermediate stage of generating an RE-encoded document 160. The alternative method, like the method 100, preserves the explicit or implict structure in the SE source document 110. The alternative method uses a variant of the method 300 to convert SE words in the SE source document 110 to rendered RE words. The difference between the method 300 as described above and the variant method is that the variant method, instead of adding the chosen RE-encoded word to an RE-encoded document 160 at step 350 if the output classification is "R", adds the rendered version of the chosen RE word directly to the rendered RE document 180. The rendered version of the chosen RE word is also retrievable from the RE database 150, as described in more detail below. If the output classification is "A", the variant method at step 360 adds the the current SE word to the rendered RE document 180, followed by rendered version of the chosen RE word, tagged with a "special" format. If the output classification is "U", the variant method at step 360 adds the current SE word to the rendered RE document 180. The three output classifications (U/R/A) are explained in detail below.

The variant method also omits step 370, and therefore does not add supplementary information to the rendered RE document 180, unlike the method 300.

The key to Readable English is the disambiguation of SE graphemes (character combinations) into distinct phonemes. SE words are represented by sequences of RE phonemes. Table 1 below has six rows, one corresponding to each SE vowel grapheme. The cells containing entries along each row are the RE phonemes that are "equivalent" to the corresponding grapheme, i.e. the phonemes as which the corresponding grapheme may be pronounced in one or more English words. Each RE phoneme is represented in its cell by an example word containing the grapheme when pronounced as the equivalent phoneme. The grapheme corresponding to the row in which the RE phoneme appears, i.e. to which the RE phoneme is equivalent, is referred to as the "base" grapheme associated with the RE phoneme.

The first column of Table 1 represents the basic RE phoneme corresponding to the base grapheme, i.e. the phoneme as which the base grapheme is most frequently pronounced. The "schwa" (column 3) is the "neutral" sound of an unstressed vowel, represented as "e" in the phonetic alphabet. Note that there is no entry in column 1 of the row corresponding to the base grapheme "y" since the "basic" y sound is a consonant (as in "yes"). The "silent" column (column 9) contains "silent" phonemes used to represent the corresponding grapheme when it is silent, like the "a" in "eat".

TABLE 1

SE vowel graphemes and equivalent RE phonemes

| SE vowel grapheme | 1 Short (basic) vowel | 2 Long vowel | 3 Schwa | 4 Short "i" sound | 5 "oo" sound | 6 other | 7 other | 8 | 9 Silent |
|---|---|---|---|---|---|---|---|---|---|
| a | at | ate | about | certificate | | wash | bath | | eat |
| e | bet | be | label | England | grew | rein | | | height |
| i | it | kite | pencil | | | taxi | | | tail |
| o | off | no | dragon | women | to | foot | | | phoenix |
| u | up | unit | | busy | fruit | put | guava | | unique |
| y | | type | syringe | gym | | baby | | | way |

Table 2 below has twenty-one rows, one row corresponding to each SE consonant grapheme. The cells containing entries along each row are the the RE phonemes that are equivalent to the corresponding consonant grapheme, i.e. the phonemes as which the corresponding consonant grapheme may be pronounced in one or more Engtlish words. Each RE phoneme is represented in its cell by an example word containing the grapheme when pronounced as the equivalent phoneme. As in Table 1, the first "basic" column represents the basic phoneme corresponding to the base grapheme, and the ninth "silent" column contains "silent" phonemes used to represent the corresponding grapheme when it is silent; like the "b" in "debt". The entry in the first column of the row corresponding to the base grapheme "y" is the consonant "y" sound (as in "yes").

Rarely-used phonemes, or phonemes that are pronounced similarly to an RE phoneme with the same base grapheme, have therefore not been made a part of the RE phoneme set. For example, the "u-schwa" sound in "medium" mentioned above is very similar to the basic "u" sound (the short-"u" in "up"), so the "u-schwa" in "medium" may be encoded as the basic "u" sound without a significant loss of phonetic accuracy.

Each RE phoneme is encoded by the label of the row and column in which it appears. For example, the long "a" sound in "ate" is encoded as "a2". However, certain RE phonemes or RE phoneme pairs map to the same sound; for example

TABLE 2

SE consonant graphemes and equivalent phonemes

| SE consonant grapheme | 1 Basic consonant | 2 Other | 3 | 4 | 5 | 6 | 7 | 8 | 9 |
|---|---|---|---|---|---|---|---|---|---|
| b | bat | | | | | | | | debt |
| c | cat | ice | vicious | | | | | | pick |
| d | den | | | | | | | | (silent d) |
| f | fan | of | | | | | | | (silent f) |
| g | got | gin | | | | | | | gnaw |
| h | hen | the | | | | | | | night |
| j | jig | | | | | | | | (silent j) |
| k | kit | | | | | | | | know |
| l | lad | | | | | | | | calm |
| m | man | | | | | | | | mnemonic |
| n | nip | | | | | | | | damn |
| p | pit | | | | | | | | pneumatic |
| q | quay | | | | | | | | (silent q) |
| r | red | | | | | | | | (silent r) |
| s | sun | is | pressure | Asia | | | | | island |
| t | top | the | nation | | | | | | bouquet |
| v | van | | | | | | | | (silent v) |
| w | wet | | | | | | | | write |
| x | box | | | | | | | | (silent x) |
| y | yes | | | | | | | | |
| z | zip | | | | | | | | (silent z) |

The eighty-nine RE phonemes in the RE phoneme set shown in Table 1 and Table 2 have been chosen as a tradeoff between two conflicting goals: accurately encoding the phonetics of spoken English, and ease of learning by a would-be reader. Adding more phonemes allows more accurate phonetic encoding of a larger number of words. For example, Table 1 does not include a "u-schwa" sound as may be heard in the word "medium". Each different RE phoneme (or its rendered representation) in principle needs to be learned by a would-be reader, so increasing the number of RE phonemes tends to increase the difficulty of learning RE.

the "oo" sound in "to" may be encoded as "e5", "o5" or "u5". Some homophonic ambiguity therefore remains in encoded RE.

In addition, some of the RE phonemes may be combined in pairs to form phoneme pairs which are pronounced as a single sound. Table 3 below shows twenty-two phoneme pairs formed by the RE phoneme pair in the corresponding row and column. Each phoneme pair is represented by a word exemplifying the pronunciation of the phoneme pair. Readable English

TABLE 3

RE phoneme pairs

| RE phoneme | g1 | h1 | h2 | i1 | o6 | r1 | u1 | w1 | y1 |
|---|---|---|---|---|---|---|---|---|---|
| a1 |  |  |  |  |  | car |  |  |  |
| a2 |  |  |  |  |  | bare |  |  |  |
| a3 |  |  |  |  |  | coward |  |  |  |
| a6 |  |  |  |  |  | ward |  |  |  |
| c1 |  | chin |  |  |  |  |  |  |  |
| e1 |  |  |  |  |  | her |  | few |  |
| e6 |  |  |  |  |  | where |  |  |  |
| i1 |  |  |  |  |  | fir |  |  |  |
| n1 | ring |  |  |  |  |  |  |  |  |
| o1 |  |  |  | coin |  | for | out | how | boy |
| o3 |  |  |  |  |  | word |  |  |  |
| p1 |  | phone |  |  |  |  |  |  |  |
| q1 |  |  |  |  |  |  | quit |  |  |
| s1 |  | ship |  |  |  |  |  |  |  |
| t1 |  | thin |  |  |  |  |  |  |  |
| t2 |  |  | the |  |  |  |  |  |  |
| u1 |  |  |  |  |  | fur |  |  |  |

It is apparent from Table 3 that certain RE phonemes may be pronounced in more than one way depending on their context. For example "c1" when followed by "h1" is pronounced as the "ch" sound in "chin", otherwise as the "c" sound in "cat". Likewise, some RE phonemes are only "half-phonemes" in the sense that they only have a pronunciation when they are paired with another RE phoneme. For example, "t2" has no pronunciation unless followed by "h2" to make the voiced "th" sound in "the". However, there is no homographic ambiguity of RE phoneme sequences within syllables. For example, there is no English word containing a syllable in which "c1h1" is pronounced as the "c" of "cat" followed by the "h" of "hot". Therefore, once a would-be reader is trained in the recognition of the specific phoneme pairs in Table 3, e.g. to pronounce "c1h1" as in "chin" rather than as the separate sounds of "c" and "h", they will find no homographic ambiguity in any RE-encoded word with properly inserted syllable breaks.

It is also apparent from Table 3 that certain RE phoneme pairs represent sounds that are already represented in Table 1 or Table 2; for example the RE phoneme pair "p1h1" represents the same sound as RE phoneme "f1". This redundancy has the benefit of preserving the spelling/shape of many more English words in the RE encoding than would otherwise have been possible, at a small extra cost of learning.

The phonemes in Table 1 and Table 2 and the phoneme pairs in Table 3, because of their unambiguous (within any syllable) mapping to a unique sound regardless of context, may be taught in isolation by simples games and other forms of repetition.

Appendix A contains a fragment of an RE-encoded XML document encoding the SE text "I am happy to join with you today in what will go down in history as the greatest demonstration for freedom in the history of our nation." The XML fragment in Appendix A shows the syllable breaks in each word and the sequences of RE phonemes to which each syllable has been mapped. The XML fragment in Appendix A also preserves punctuation marks and contains tags indicating paragraphs, sentences, and formatting lines.

Figure 4A:
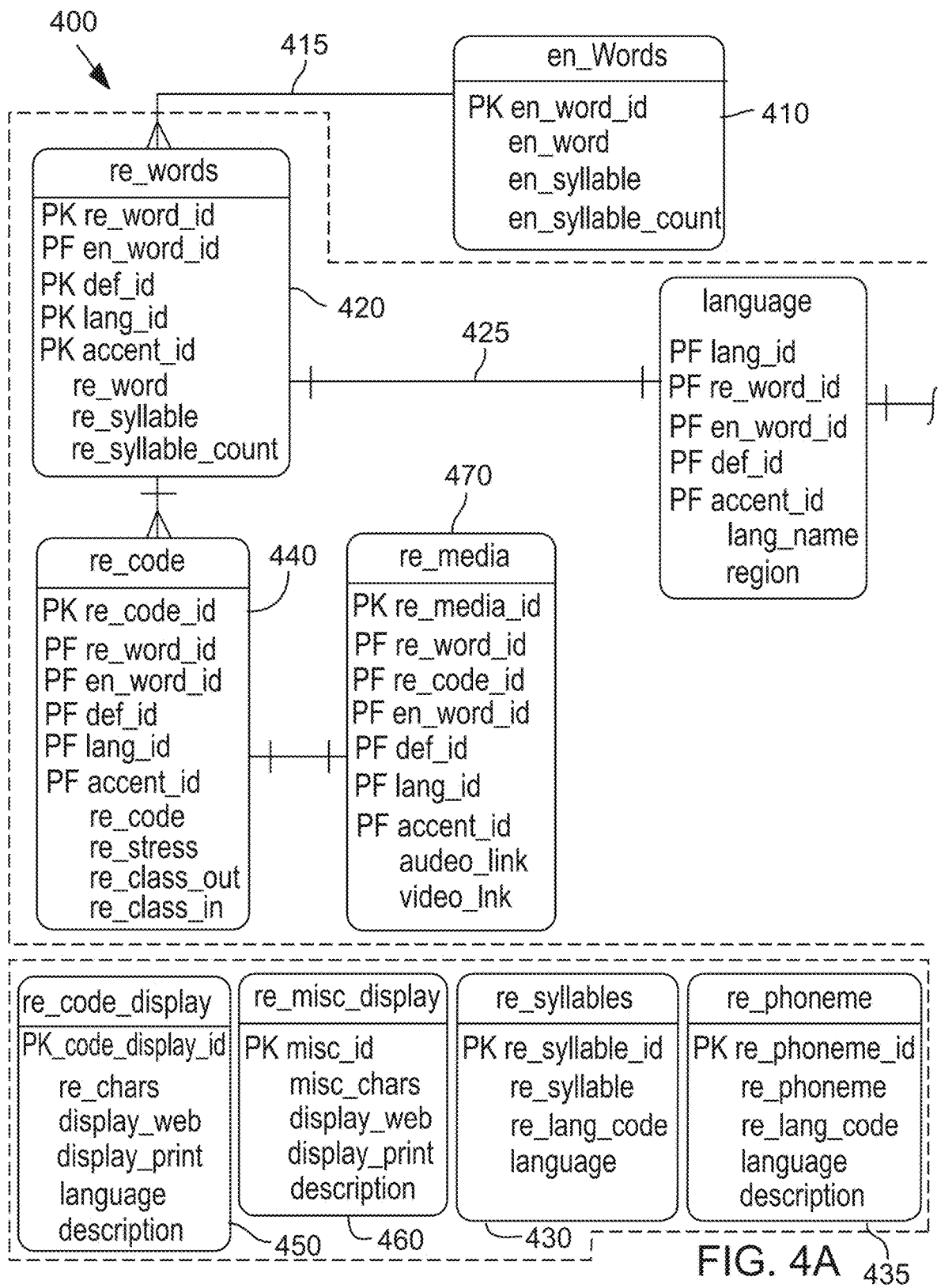
FIGS. 4A and 4B are adjacent halves of an Entity Relationship diagram illustrating the structure of the RE database of FIG. 1.
Figure 4B:
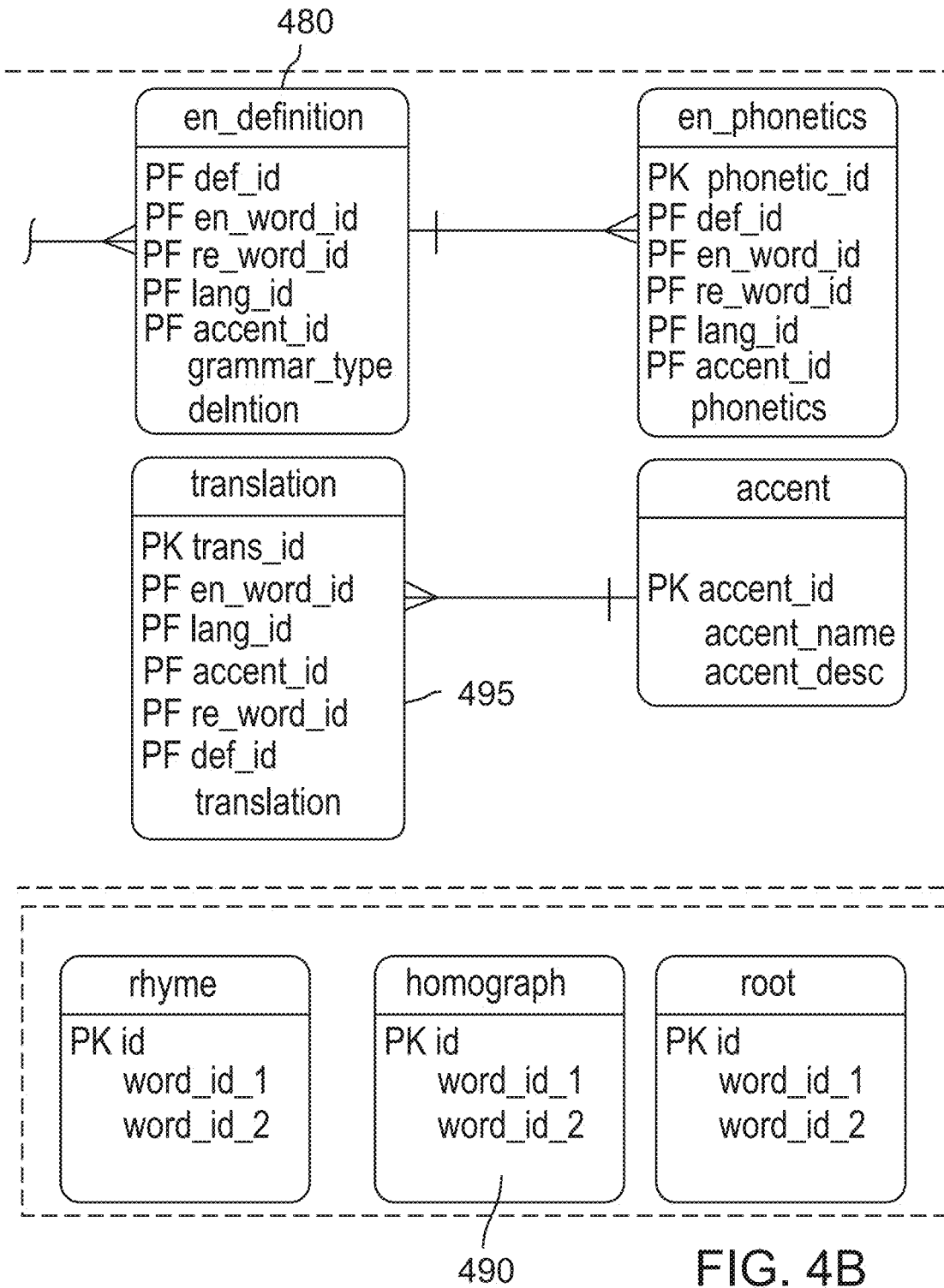

FIGS. 4A and 4B are adjacent halves of an Entity Relationship diagram illustrating the structure 400 of the RE database 150 of FIG. 1. Each box in the structure 400, e.g. the box 410, represents a different table in the RE database 150.

Table 4 lists the tables in the RE database structure 400 illustrated in FIGS. 4A and 4B, together with, for each table: the primary key constraint; the number of primary key columns; the total number of columns; and a brief description of the table contents.

TABLE 4

List of tables in RE database 150

| Table name | Primary key constraint | Primary key columns | # Columns | Description |
|---|---|---|---|---|
| accent | PK_accent | accent_id | 3 | Accent information for a specific language and region. |
| en_definition | PK_en_definition | def_id, en_word_id, re_word_id, lang_id, accent_id | 7 | Definitions of words in English. |
| en_phonetics | PK_en_phonetics | phonetic_id, def_id, en_word_id, re_word_id, lang_id, accent_id | 7 | Representations of words in international phonetic alphabet. |
| en_Words | PK_en_Words | en_word_id | 4 | Master word list in SE spellings and syllables. |
| homograph | PK_homograph | id | 3 | Relationships between pairs of words which are homographs. |
| language | PK_language | lang_id, re_word_id, en_word_id, def_id, accent_id | 7 | Various language names and regions where that language is used. |
| re_code_display | PK_re_code_display | char_id | 8 | Controls the display of the RE |

TABLE 4-continued

List of tables in RE database 150

| Table name | Primary key constraint | Primary key columns | # Columns | Description |
|---|---|---|---|---|
| | | | | phonemes for web and print output. Also allows customisation of the phoneme display based on the user's preferences. |
| re_code | PK_re_code | re_code_id, re_word_id, en_word_id, def_id, lang_id, accent_id | 9 | Rendered RE-encoded words |
| re_media | PK_re_media | re_media_id, re_word_id, re_code_id, en_word_id, def_id, lang_id, accent_id | 9 | Multimedia content for pronunciation help. |
| re_misc_display | PK_re_misc_display | misc_id | 7 | Display settings for stress and syllable breaks. Also settings for display of the RE word. |
| re_syllables | PK_re_syllables | re_syllable_id | 7 | RE syllables and related information. |
| re_words | PK_re_words | re_word_id, en word_id, def_id, lang_id, accent_id | 8 | RE words and syllables. |
| rhyme | PK_rhyme | id | 3 | Relationships between pairs of words which rhyme. |
| root | PK_root | id | 3 | Relationships between pairs of words in which one word forms the root for the other word. |
| translation | PK_translation | trans_id, en_word_id, lang_id, accent_id, re_word_id, def_id | 7 | Translated words into multiple languages. |

The table en_Words 410 contains SE words, each with a unique identifier stored in the column en_word_id in the row corresponding to the SE word. The table en_Words 410 contains proper names as well as normal words. Likewise, the table re_Words 420 contains RE-encoded words, each with a unique identifier stored in the column re_word_id in the row corresponding to the RE-encoded word. The supplementary information extracted from the RE database 150 in step 370 of the method 300 is extracted using the identifier of each unique encoded RE word in the RE-encoded document.

The links, e.g. 415, between the tables in the RE database structure 400 show relations between the various tables making up the RE database 150. For example, each SE word in the table en_Words 410 has one or more "child" RE words in the table re_Words 420, as indicated by the link 415. The "child" RE words of an SE word are the RE equivalents to the SE word that are retrieved in step 310 of the method 300. The linkage is implemented through the column en_word_id in the table re_Words 420, which refers each RE word back to its "parent" SE word through the unique identifier for that SE word. For example, the SE word "minute" has a certain unique identifier in the en_word_id column of the table en_Words 410. The two RE words equivalent to "minute" are encoded by the method 500, to be described below, as "m1i1n1-u1t1e9" (meaning sixty seconds, or a documentary record of a meeting) and "m1i2-n1u2t1e9" (meaning small). Each of these two RE-encoded words has the unique identifier of the SE word "minute" in the en_word_id column of the corresponding row in the table re_Words 420. This linkage enables the two RE-encoded words to be swiftly retrieved in step 310 of the method 300 in response to the occurrence of the SE word "minute".

Each RE-encoded word in the table re_Words 420 comprises one or more RE-encoded syllables (in the column re_syllable). Each RE-encoded syllable in an RE-encoded word also appears in the table re_syllables 430, alongside the SE spelling of the syllable (in the column re_lang_code).

There is therefore some redundancy in the RE database structure 400. In an alternative implementation, each RE-encoded word in the table re_Words 420 does not contain RE-encoded syllables, but rather comprises an ordered sequence of identifiers of RE-encoded syllables as found in the re_syllable_id column of the table re_syllables 430. In this implementation, each RE-encoded syllable appears exactly once in the RE database structure 400. This alternative implementation requires less storage space, but is slower to query.

Each RE-encoded word in the table re_Words 420 also comprises an indication of which syllable(s) are stressed in that word.

The table re_code 440 contains rendered versions of the RE-encoded words stored in the table re_Words 420. The rendering of RE-encoded words, which makes use of the tables re_code_display 450 and re_misc_display 460, is described in more detail below with reference to FIG. 8. The table re_code 440 is used by the variant of the method 300, described above, to retrieve the rendered version of the chosen RE word when generating a rendered RE document 180 directly from an SE source document 110 as in the "alternative method" described above.

The table re_code 440 also contains, in the re_class_in field, the input classification (U/S/T/X) of the RE-encoded words stored in the table re_Words 420. Input classifications are described below in more detail. The table re_code 440 also contains, in the re_class_out field, the output classification (U/R/A) of the RE-encoded words stored in the table re_Words 420. The output classification is used at step 330 of the method 300 described above to govern how an RE word is added to an RE-encoded document 160 or a rendered RE document 180.

The table re_media 470 contains an audio and/or video representation of each RE-encoded word in the table re_Words 420. In one implementation, the table re_media 470 also contains an audio and/or video representation of each RE-encoded syllable in the table re_syllables 430. The audio representation is a recording of the pronunciation of the RE-encoded word or syllable, stored as a digitally-encoded and compressed audio file according to a standard such as mp3. The video representation is a dynamic graphic of the human vocal system during the pronunciation of the word or syllable, showing how the position of the various parts of the system such as lips and tongue change during the pronunciation of the word or syllable. The video representation is stored as a digitally-encoded and compressed video file according to a standard such as MPEG.

The table en_definition 480 contains one or more English-language definitions for each RE-encoded word in the table re_Words 420. In addition, the table en_definition 480 stores the part of speech of the defined word (noun, verb etc.). For example, the RE-encoded word "m1i1n1-u1t1e9" in the table re_Words 420 is linked to two definitions in the table en_definition 480 via the link 425: one (a noun) being "sixty seconds" and one (also a noun) being "a documentary record of a meeting".

The table homograph 490 contains pairs of RE words that are homographs, i.e. are spelled the same way in SE. Each pair is defined by two identifiers of RE-encoded words in the table re_Words 420. For example, one entry in the table homograph 490 contains the identifiers of the two RE-encoded words "m1i1n1-u1t1e9" and "m1i2-n1u2t1e9", which are both spelled as "minute" in SE, from the table re_Words 420 in the columns word_id_1 and word_id_2.

The table translation 495 contains one or more translations for each RE-encoded word in the table re_Words 420 into languages other than English.

The table re_phoneme 435 contains a language-specific phonetic equivalent for each RE phoneme or phoneme pair in a language other than English, or the nearest equivalent phoneme in that language, expressed in its own alphabet. For example, the French language has no equivalent phoneme to the RE phoneme "t2h2" (the voiced "th" sound in "this"). This phoneme is typically represented phonetically in French textbooks as "tz", so the re_lang_code column in the table re_phoneme 435 contains a "tz" in a row corresponding to the RE phoneme "t2h2".

Table 5 is an extract from the table re_phoneme 435 containing the French-language equivalents of the RE phonemes and phoneme pairs in Table 1, Table 2, and Table 3. The first column lists the RE phonemes and phoneme pairs, such that homophonic phonemes and phoneme pairs are listed in the same row, while the second column lists the French phonetic equivalent or near equivalent from the re_lang_code column in the table rephoneme 435, explained in French.

TABLE 5

French equivalents for RE phonemes

| Readable English phonemes and phoneme pairs | French phonetic equivalent | IPA equivalent |
|---|---|---|
| a | a dans chat | æ |
| e | e dans met | ɛ |
| i, ă, ĕ, ŏ, ŭ, ẏ | i dans pique-nique | ɪ |
| o, å | o dans chope | ɒ |
| u, ḁ, ḙ, ĭ, ŏ, ẏ | (presque) a dans patte | ʌ |
| ā, ē | éi dans oseille | eɪ |
| ē, ī, ȳ | î dans Nîmes | iː |
| ī, ȳ | ai dans ail | aɪ |
| ō | au dans automne | oʊ |
| ū, ew | you dans youpi | juː |
| oo, ë, ö, ü | ou | uː |
| ȯ, ù | le chinook (le vent du Canada) or ou dans bouquet | ʊ |
| ou, ow | ao dans Laos | aʊ |
| oi, oy | oy dans cow-boy | ɔɪ |
| ar | ar dans armée | ɑɹ |
| er, ir, ur, ăr, ŏr | eure dans heure | ɜɹ |
| or, år | or dans dormir | ɔɹ |
| ār, ér | ère dans mère | ɛɹ |
| ēr̂ | ir dans finir | iɹ |
| īr | ɑ̈er | aɪɹ |
| ūr | ur dans pur | juɹ |
| b | b dans boudoir | b |
| c, k, q | e dans canard | k |
| ch | tch dans tchin-tchin | tʃ |
| d | d dans donne | d |
| f, ph | f dans La Fayette | f |
| g | g dans gare | g |
| h | h comme un rire: ha ha ha (Il se pronounce en expirant légèrement, avec aspiration.) | h |
| j, ġ | j dans jet-set | dʒ |
| l | l dans longue | l |
| m | m dans merci | m |
| n | n dans non | n |
| ng | nng | ŋ |
| p | p dans parfait | p |
| r | (Different du son francais. Il n'est ni roulé ni guttural.) | ɹ |
| s, ç | s dans sirène et c en cinq | s |
| ṣ | j dans jaune | ʒ |
| sh, çh, ĉ, ŝ, t̂ | ch dans chemise | ʃ |
| t | t dans tu | t |

TABLE 5-continued

French equivalents for RE phonemes

| Readable English phonemes and phoneme pairs | French phonetic equivalent | IPA equivalent |
|---|---|---|
| th | tz (tzisse pour "this" en Anglais) | θ |
| th | tz (tzisse pour "this" en Anglais) | ð |
| v, f̌ | v dans vraiment | v |
| w, ǔ | ou dans ouate | w |
| x | cse dans sicse ("six" en Anglais) | ks |
| y | y dans yaourt | j |
| z, ş | s dans rose | z |

The language column contains a two-letter code indicating the language of the RE phoneme representation. Each language-specific equivalent phoneme in the table re_phoneme 435 is used to produce a corresponding language-specific phonetic representation of one or more RE-encoded syllables in the table re_syllables 430. The language-specific phonetic equivalents of RE phonemes and RE-encoded syllables may be used in turn to produce a language-specific phonetic representation of each word in an RE-encoded document.

The table re_phoneme 435 also contains a phonetic equivalent or near equivalent for each RE phoneme or phoneme pair in the International Phonetic Alphabet (IPA). The third column in Table lists the nearest equivalent of each RE phoneme or phoneme pair in the IPA. The IPA equivalents in the table re_phoneme 435 may be used to produce a language-specific phonetic representation of each word in an RE-encoded document in a language other than the languages already represented directly in the table re_phoneme 435. The mapping from RE phonemes to the IPA in the table re_phoneme 435 can be used to produce an intermediate representation of the RE-encoded document in the IPA, and a further table that maps IPA phonemes to graphemes in that language can then be used to generate the phonetic representation in that language from the intermediate representation.

Figure 5:
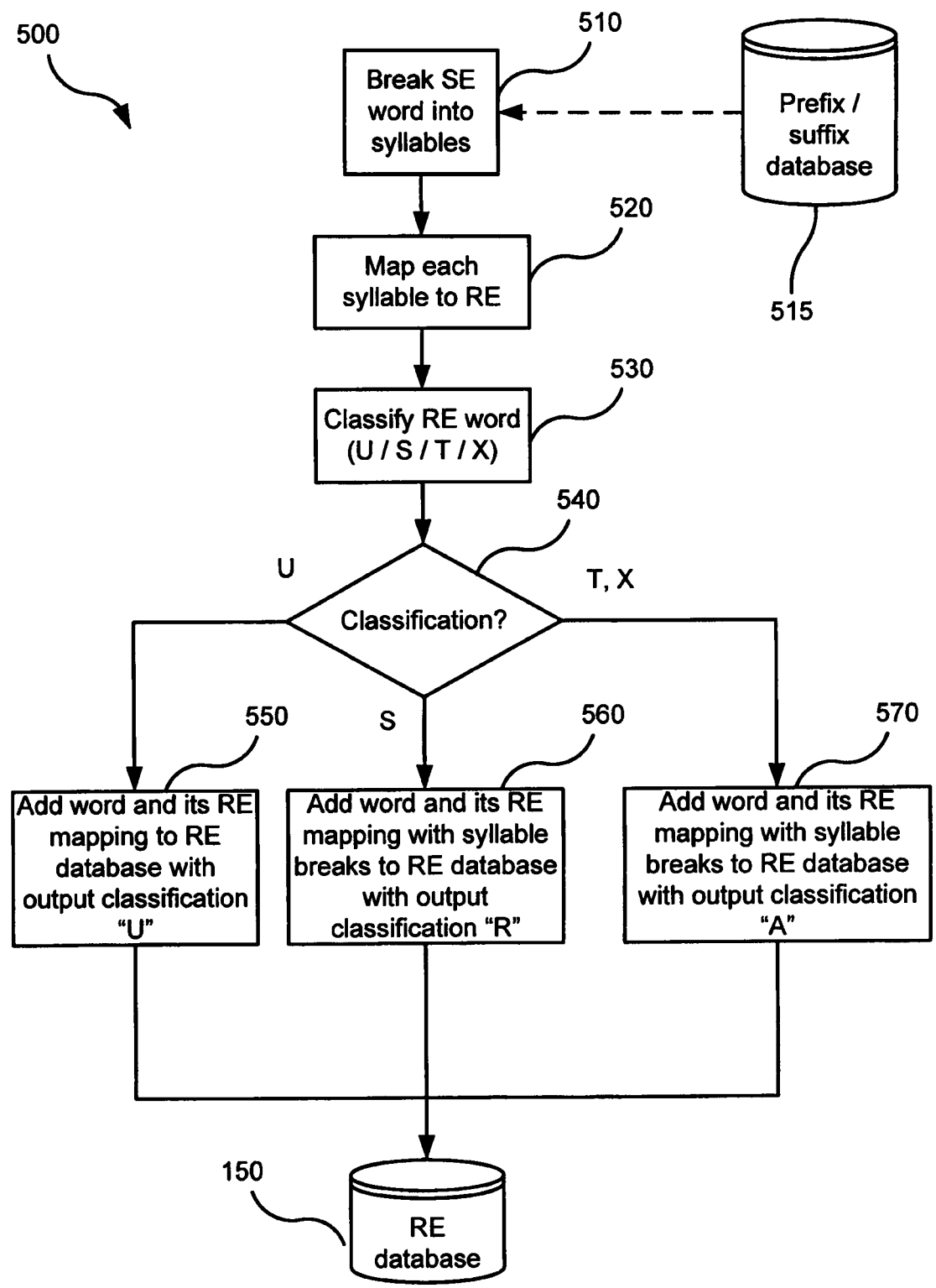
FIG. 5 is a flow chart illustrating a method of adding an SE word to the RE database of FIG. 1.

FIG. 5 is a flow chart illustrating a method 500 of adding an SE word to the RE database 150 of FIG. 1. The method 500, like the method 100, may be implemented in the computing system 200 as software 233 controlled and executed by the processor 205. In one implementation, the RE database 150 is stored in the hard disk drive memory 210 of the computing system 200. In an alternative implementation, suitable when the RE database 150 is stored in the hard disk drive memory of a remote computing system, the computing system 200 carrying out the method 100 queries and updates the RE database 150 via the network connection 220 or 222 according to conventional protocols for accessing a database over a network. In such an implementation, the remote computing system may provide access to the RE database 150 via a server application such as a "Wiki". The RE database 150 may thereby be quickly built up by multiple users all running separate instances of the method 500 via Web browsers on separate computing systems 200. Such a model is particularly suited to the addition of proper names to the RE database 150.

The method 500 starts at step 510, which breaks the SE word into syllables. The step 510 makes use of a prefix/suffix database 515, which is simply a table listing common prefixes and suffixes in English. For example, in step 510, breaking the SE word "thinking" into syllables is assisted by the identification of the suffix "ing" in the prefix/suffix database 515. If the SE word has only one syllable, step 510 has no effect. In one implementation, step 510 involves the intervention of a human operator to manually identify syllable breaks in addition to those following or preceding any prefixes or suffixes identified using the prefix/suffix database 515.

If there are multiple valid ways to break the SE word into syllables, e.g. "minute" as "mi-nute" (meaning small) or "min-ute" (meaning sixty seconds), the remaining steps of the method 500 are carried out for each such breaking. Alternatively, the human operator is provided with the context of the SE word, and infers based on the context which of the multiple breakings is the correct one for the context. The remaining steps of the method 500 are carried out only for that breaking.

In the following step 520, each grapheme of each syllable in the SE word is mapped to the equivalent RE phoneme. In one implementation, step 520 involves intervention by a human operator to manually partition the syllable into graphemes and identify the equivalent RE phoneme(s) from the SE grapheme(s). The result of step 520 is an RE encoding of the SE word.

In one implementation of step 520, the table re_syllables 430 in the RE database 150 is queried to retrieve all previous RE mappings of the SE syllable. The retrieved RE mapping(s) are presented via a graphical user interface to the operator, who may choose one of the presented mapping(s) as the correct mapping of the syllable in the context of the SE word. Alternatively, if none of the retrieved mappings is correct, the human operator may define a new RE mapping for the SE syllable.

Often there are multiple RE mappings for the SE syllable. For example, the SE word "row" may be mapped into RE as "r1o2w9" (to rhyme with "no") or as "r1o1w1" (to rhyme with "how"). In this case, the remaining steps of the method 500 are carried out for each such possible mapping. Alternatively, the human operator is provided with the context of the SE word, and infers based on the context which of the multiple mappings is correct for the context. The remaining steps of the method 500 are carried out only for that mapping.

Step 530 classifies the RE encoded word, based on the RE mapping from step 520, into one of four input classifications labelled as "U" (for "unchanged"), "S" (for "syllable"), "T" (for "translate"), and "X" (for "exception"). In one implementation, step 520 involves intervention by the human operator to manually classify the RE word. The input classification determines the output classification of the, or each, RE word equivalent to the SE word, which in turn governs how the RE word equivalent to the SE word is encoded in an RE-encoded document 160 by the encoding process 300 described above.

The input classification "U" indicates that the SE word has only one syllable and is "phonetic" in the sense that all the graphemes in the SE word were mapped to their corresponding basic phoneme. In other words, the RE equivalent word has no syllable breaks and is encoded using only basic phonemes, i.e. entries in the "1" columns of Table 1 and Table 2 that correspond to the respective SE graphemes. For example, the word "bat" is classified as "U" because it has one syllable and the grapheme "b" is encoded in RE as "1", the grapheme "a" is encoded in RE as "a1", and the grapheme "t" is encoded in RE as "t1". If the input classification is "U", step 340 simply adds the SE word itself to the RE-encoded document, because the equivalent RE word is rendered in step 170 by default identically to the appearance of the SE word. (Step 170 is described in more detail below.)

The input classification "S" indicates that the SE word has more than one syllable, and therefore needs syllable breaks, but each syllable is "phonetic" in the sense that all the graphemes in the syllable were mapped to their corresponding basic phoneme. In other words, each syllable of the RE equivalent word is encoded using only basic phonemes that correspond to the respective SE graphemes. For example, the word "cannot" is broken into syllables as "can-not", and each syllable is encoded using only the entries in the "1" columns of Table 1 or Table 2 corresponding to the respective SE graphemes. If the input classification is "S", step 350 adds the RE equivalent word including the syllable breaks to the RE-encoded document, because the rendering step 170 needs the syllable breaks to render the word in RE.

The input classification "T" indicates that the SE word has at least one syllable that is "non-phonetic" in the sense that at least one grapheme in the syllable was mapped to a "non-basic" phoneme. For example, in the SE word "grow" the grapheme "o" is mapped to the "long o" phoneme encoded in RE as "o2", and the "w" grapheme is silent (encoded in RE as "w9"). However, each non-phonetic syllable in the SE word was mapped to RE phonemes corresponding to the respective SE graphemes. In other words, the base graphemes corresponding to each RE phoneme spell the syllable. For example, the SE word "grow" is classified "T" because the non-phonetic graphemes "o" and "w" are encoded as "o2" and "w9", both of whose base graphemes "o" and "w" in Table 1 and Table 2 spell the non-phonetic part of the syllable. If the input classification is "T", step 350 adds the RE equivalent word (including any syllable breaks) to the RE-encoded document.

RE equivalent encodings with classifications of U, S, and T "preserve the spelling" of the SE word, in that the base graphemes corresponding to the mapped RE phonemes correspond to the respective SE graphemes.

The input classification "X" indicates that the SE word has at least one syllable that was not mapped to RE phonemes corresponding to the respective SE graphemes. In other words, the RE mapping does not "preserve the spelling" of the SE word. For example, the SE word "one" is classified "X" because its single syllable is non-phonetic, being mapped to "w1u1n1", whose base graphemes "w", "u", and "n" do not spell the syllable. If the input classification is "X", step 360 adds the SE word and the RE equivalent word (including any syllable breaks) to the RE-encoded document, with the SE word being tagged with a "special" format. The reason for this dual encoding of X-classified words in step 360 is explained below.

Some SE words have a different classification depending on the particular RE mapping. For example, the SE word "sewer" with the meaning of a pipe for waste liquids is mapped to the RE phonemes "s1e5w1e1r1", with a classification of "T". However, the SE word "sewer" with the meaning of a person who sews is mapped to the RE phonemes "s1o2w1e1r1", with a classification of "X".

Following step 530, the method 500 proceeds to step 540 which examines the input classification determined in step 530 to determine which step to execute next. If the input classification is "U", step 550 sets the output classification to "U" and adds the current word to the RE database 150. If the input classification is "S" or "T", step 560 sets the output classification to "R" and adds the current word to the RE database 150. If the input classification is "X", step 570 sets the output classification to "A" and adds the current word to the RE database 150.

Each of steps 550, 560, and 570 involves multiple substeps:
  Adding the current SE word to the table en_Words 410;
  Adding the RE-encoded word to the table re_Words 420;
  Adding any mapped RE syllable not already in the table re_syllables 430 to the table re_syllables 430;
  Adding the rendered version of the RE-encoded word and its input classification (U/S/T/X) to the table re_code 440 (the rendering of RE-encoded words is described in more detail with reference to FIG. 8 below);
  Adding the output classification (U/R/A) of the RE-encoded word to the table re_code 440.
  Adding the audio and video representations of the RE-encoded word to the table re_media 470;
  Adding the definition of the RE-encoded word to the table en_definition 480. (If there are multiple definitions for the RE-encoded word, each such definition is added to the table en_definition 480, along with a corresponding part of speech (noun, verb etc.).
  If there were multiple valid ways to break the SE word into syllables found at step 510, or multiple possibly correct mappings for any of the SE syllables found at step 520, adding the multiple RE encodings of the SE word to the table homograph 490.

The mapping of syllables in a SE word to a phonetically equivalent sequence of RE phonemes at step 520 is performed according to a given regional accent. In a preferred implementation, the regional accent chosen is the one with which the intended audience of readers is most familiar. The RE database 150 is configured to be editable so that the mapping of SE words to RE syllables can be altered to suit a different regional accent.

In one implementation, the RE database 150 is configured to contain words in languages other than standard English, and their RE-encoded equivalents or near equivalents. In such an implementation, the method 500 would be able to add, for example, the French word "bonjour", meaning "good day", and an approximate RE equivalent sequence, e.g. "b1o2n1-j1o9u2r1" to the RE database 150. In this implementation, RE-encoded versions of text documents in languages other than standard English can be generated using the method 100 described above.

As mentioned above, the table re_code_display 450 in the database structure 400 is referenced during the rendering of an RE-encoded word, e.g. during step 170 in the method 100 of FIG. 1. The table re_code_display 450 contains one row for each of the RE phonemes listed in Table 1 and Table 2. Table 6 shows an excerpt from the table re_code_display.

TABLE 6

Excerpt from table re_code_display 450 in RE database structure

| Char_id | description | code | phone | display_web | display_print | language |
|---|---|---|---|---|---|---|
| 5 | Short "e" | e1 | e | e | e | EN |
| 6 | Long "e" | e2 | ē | ē | ē | EN |
| 7 | Schwa "e" | e3 | ə | ĕ | ĕ | EN |

The "phone" column contains the representation of the phoneme in the International Phonetic Alphabet. The display_web column contains the representation of the phoneme for Web and HTML output. The display_print column contains the representation of the phoneme for PDF and other print-formatted output. Typically, the display_web and display_print columns have identical entries in each row. The language column contains a two-letter language code for specific language rendering.

A user may alter the contents of the display_web and display_print columns in order to customise the rendering of RE according to their personal preferences. However, the default representations in the columns display_web and display_print are carefully chosen, as described below.

FIG. 6 is a flow chart representing a method 600 of rendering an RE-encoded document, e.g. the RE document 160 in FIG. 1, as used in step 170 of the method 100 of FIG. 1.

Figure 7A:
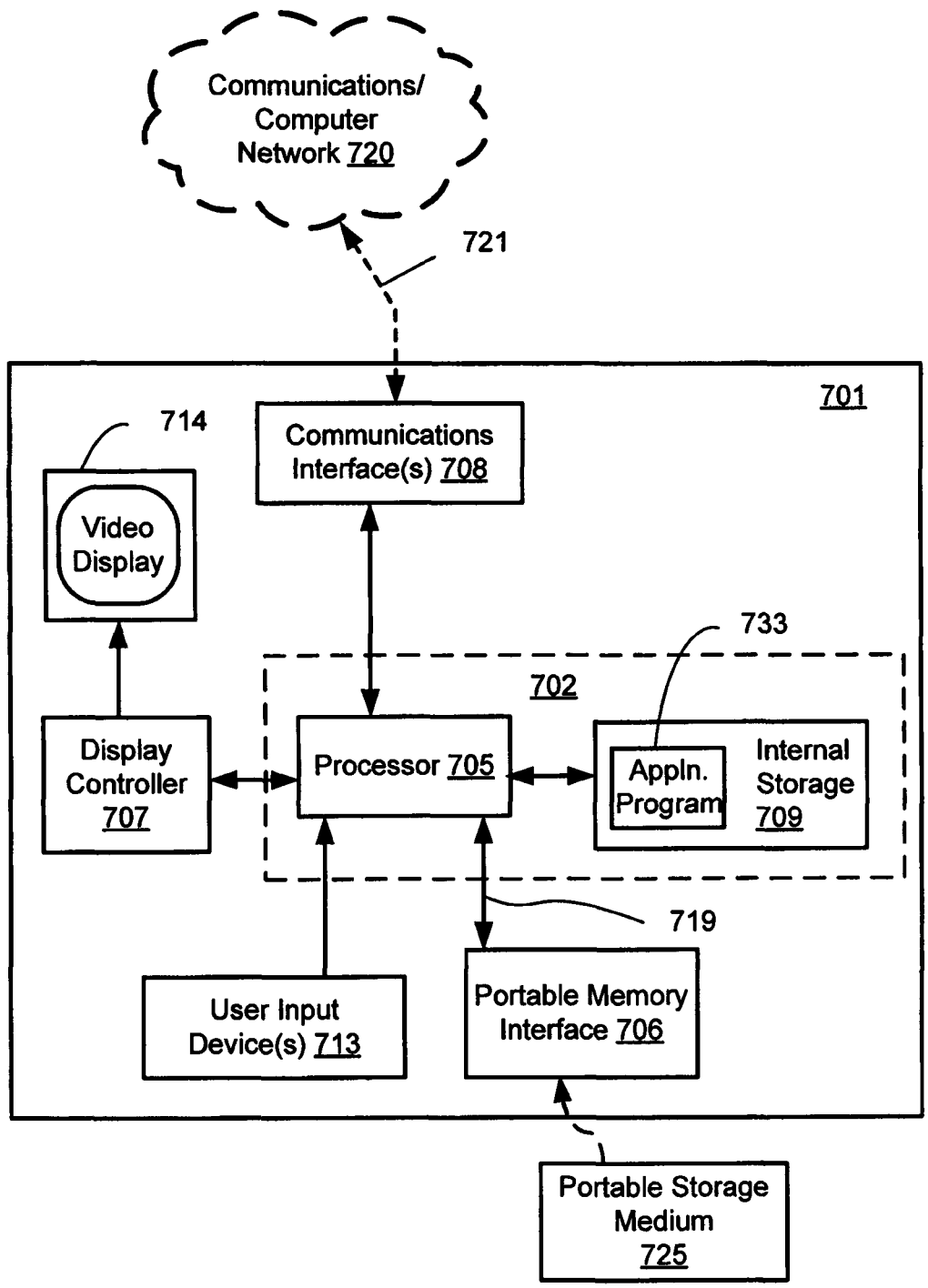
FIGS. 7A and 7B collectively form a schematic block diagram representation of an electronic device upon which the method of FIG. 6 may be implemented.
Figure 7B:
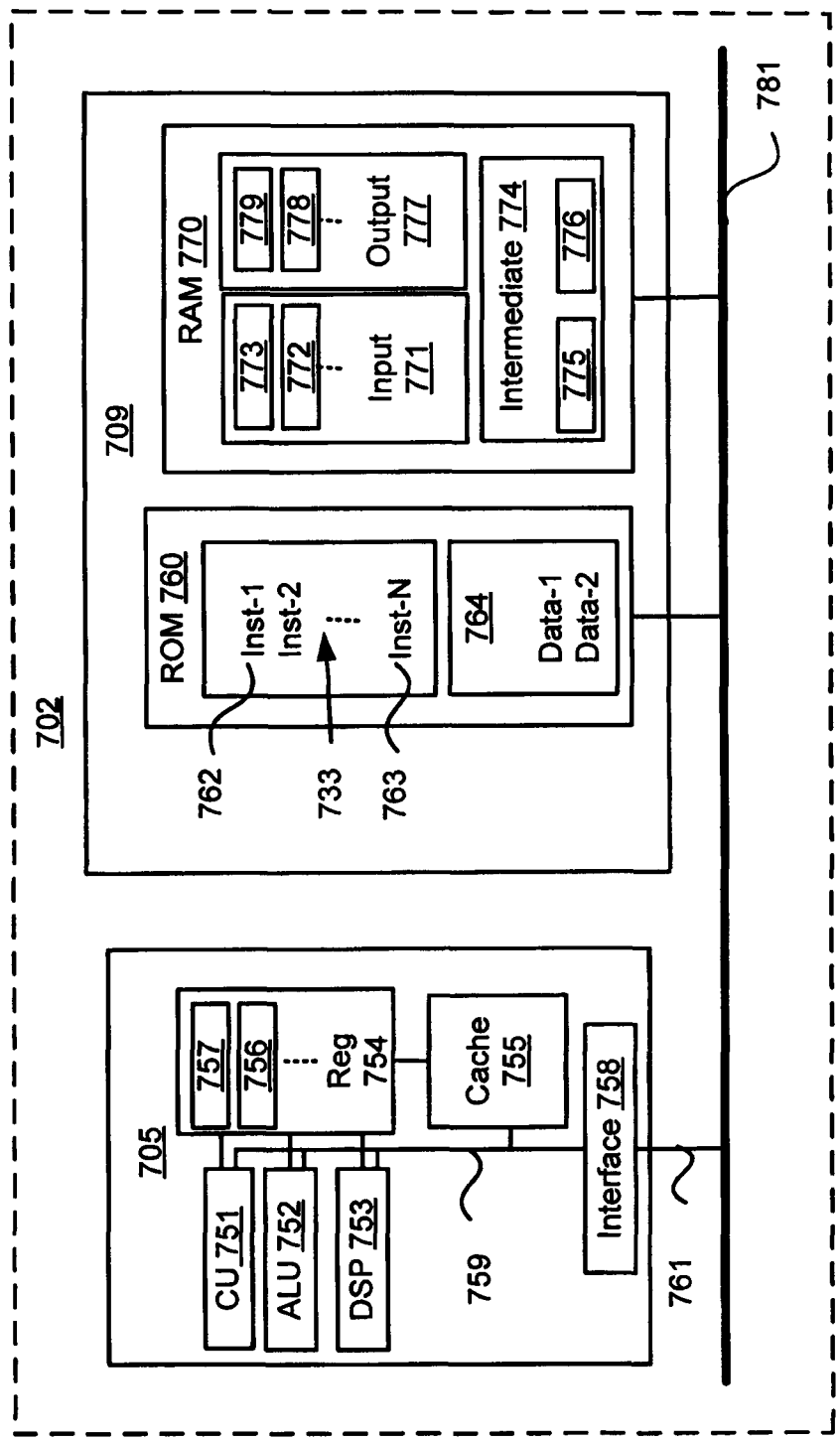

FIGS. 7A and 7B collectively form a schematic block diagram of a general purpose electronic device 701 including embedded components, upon which the method 600 may be implemented. The electronic "rendering device" 701 may be, for example, an electronic book reader (e-reader), in which processing resources are limited. The electronic "rendering device" 701 may also be a mobile computing device such as a notebook, tablet computing device, or "smartphone". Nevertheless, the method 600 may also be implemented on higher-level devices such as desktop computers, server computers, and other such devices with significantly larger processing resources, e.g. the computer system 200 of FIG. 2.

As seen in FIG. 7A, the electronic device 701 comprises an embedded controller 702. Accordingly, the electronic device 701 may also be referred to as an "embedded device." In the present example, the controller 702 has a processing unit (or processor) 705 which is bi-directionally coupled to an internal storage module 709. The storage module 709 may be formed from non-volatile semiconductor read only memory (ROM) 760 and semiconductor random access memory (RAM) 770, as seen in FIG. 7B. The RAM 770 may be volatile, non-volatile or a combination of volatile and non-volatile memory.

The electronic device 701 includes a display controller 707, which is connected to a video display 714, such as a liquid crystal display (LCD) panel or the like. The display controller 707 is configured for displaying graphical images on the video display 714 in accordance with instructions received from the embedded controller 702, to which the display controller 707 is connected.

The electronic device 701 also includes user input devices 713 which are typically formed by keys, a keypad or like controls. In some implementations, the user input devices 713 may include a touch sensitive panel physically associated with the display 714 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 7A, the electronic device 701 also comprises a portable memory interface 706, which is coupled to the processor 705 via a connection 719. The portable memory interface 706 allows a complementary portable computer readable storage medium 725 to be coupled to the electronic device 701 to act as a source or destination of data or to supplement the internal storage module 709. Examples of such interfaces permit coupling with portable computer readable storage media such as Universal Serial Bus (USB) memory devices, Secure Digital (SD) cards, Personal Computer Memory Card International Association (PCMIA) cards, optical disks (e.g. DVDs), and magnetic disks.

The electronic device 701 also has a communications interface 708 to permit coupling of the electronic device 701 to a computer or communications network 720 via a connection 721. The connection 721 may be wired or wireless. For example, the connection 721 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The method 600 may be implemented as one or more software application programs 733 executable within the embedded controller 702. In particular, with reference to FIG. 7B, the steps of the method 600 are effected by instructions in the software 733 that are carried out within the embedded controller 702. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 733 of the embedded controller 702 is typically stored in the non-volatile ROM 760 of the internal storage module 709. The software 733 stored in the ROM 760 can be updated when required from a computer readable medium. The software 733 can be loaded into and executed by the processor 705. In some instances, the processor 705 may execute software instructions that are located in RAM 770. Software instructions may be loaded into the RAM 770 by the processor 705 initiating a copy of one or more code modules from ROM 760 into RAM 770. Alternatively, the software instructions of one or more code modules may be pre-installed in a non-volatile region of RAM 770 by a manufacturer. After one or more code modules have been located in RAM 770, the processor 705 may execute software instructions of the one or more code modules.

The application program 733 is typically pre-installed and stored in the ROM 760 by a manufacturer, prior to distribution of the electronic device 701. However, in some instances, the application programs 733 may be supplied to the user encoded on the computer readable storage medium 725 and read via the portable memory interface 706 of FIG. 7A prior to storage in the internal storage module 709. Computer readable storage media refers to any non-transitory tangible storage medium that participates in providing instructions and/or data to the embedded controller 702 for execution and/or processing. Examples of such storage media include floppy disks, magnetic tape, CD-ROM, DVD, a hard disk drive, a ROM or integrated circuit, USB memory, a magneto-optical disk, flash memory, or a computer readable card such as a PCMCIA card and the like, whether or not such devices are internal or external of the electronic device 701. A computer readable medium having such software or computer program recorded on it is a computer program product. The use of such a computer program product in the electronic device 701 effects an apparatus for rendering an RE-encoded document.

In another alternative, the software application program 733 may be read by the processor 705 from the network 720, or loaded into the embedded controller 702 from other computer readable media. Examples of transitory or non-tangible computer readable transmission media that may also participate in the provision of software, application programs, instructions and/or data to the electronic device 701 include radio or infra-red transmission channels as well as a network connection to another computer or networked device, and the Internet or Intranets including e-mail transmissions and information recorded on Websites and the like.

The second part of the application programs 733 and the corresponding code modules mentioned above may be executed to implement one or more graphical user interfaces (GUIs) to be rendered or otherwise represented upon the display 714 of FIG. 7A. Through manipulation of the user input device 713 (e.g., the keypad), a user of the electronic device 701 and the application programs 733 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 7B illustrates in detail the embedded controller 702 having the processor 705 for executing the application programs 733 and the internal storage 709. The internal storage 709 comprises read only memory (ROM) 760 and random access memory (RAM) 770. The processor 705 is able to execute the application programs 733 stored in one or both of the connected memories 760 and 770. When the electronic device 701 is initially powered up, a system program resident in the ROM 760 is executed. The application program 733 permanently stored in the ROM 760 is sometimes referred to as "firmware". Execution of the firmware by the processor 705 may fulfil various functions, including processor management, memory management, device management, storage management and user interface.

The processor 705 typically includes a number of functional modules including a control unit (CU) 751, an arithmetic logic unit (ALU) 752 and a local or internal memory comprising a set of registers 754 which typically contain atomic data elements 756, 757, along with internal buffer or cache memory 755. One or more internal buses 759 interconnect these functional modules. The processor 705 typically also has one or more interfaces 758 for communicating with external devices via system bus 781, using a connection 761.

The application program 733 includes a sequence of instructions 762 though 763 that may include conditional branch and loop instructions. The program 733 may also include data, which is used in execution of the program 733. This data may be stored as part of the instruction or in a separate location 764 within the ROM 760 or RAM 770.

In general, the processor 705 is given a set of instructions, which are executed therein. This set of instructions may be organised into blocks, which perform specific tasks or handle specific events that occur in the electronic device 701. Typically, the application program 733 waits for events and subsequently executes the block of code associated with that event. Events may be triggered in response to input from a user, via the user input devices 713 of FIG. 7A, as detected by the processor 705. Events may also be triggered in response to other sensors and interfaces in the electronic device 701.

The execution of a set of the instructions may require numeric variables to be read and modified. Such numeric variables are stored in the RAM 770. The disclosed method uses input variables 771 that are stored in known locations 772, 773 in the memory 770. The input variables 771 are processed to produce output variables 777 that are stored in known locations 778, 779 in the memory 770. Intermediate variables 774 may be stored in additional memory locations in locations 775, 776 of the memory 770. Alternatively, some intermediate variables may only exist in the registers 754 of the processor 705.

The execution of a sequence of instructions is achieved in the processor 705 by repeated application of a fetch-execute cycle. The control unit 751 of the processor 705 maintains a register called the program counter, which contains the address in ROM 760 or RAM 770 of the next instruction to be executed. At the start of the fetch execute cycle, the contents of the memory address indexed by the program counter is loaded into the control unit 751. The instruction thus loaded controls the subsequent operation of the processor 705, causing for example, data to be loaded from ROM memory 760 into processor registers 754, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 733, and is performed by repeated execution of a fetch-execute cycle in the processor 705 or similar programmatic operation of other independent processor blocks in the electronic device 701.

The method 600 is carried out by the rendering device 701 for each word in the RE-encoded document to be rendered in succession. The method 600 starts at step 610, which determines whether the current word is tagged as unencoded (SE) or is encoded (RE). If RE, the method 600 proceeds to step 620, which determines whether the current word is tagged with a "special" format. (This tagging was done in step 360 of the method 300 which created the RE-encoded document if the output classification of the RE word was "A".) If so, step 630 follows, at which the current rendering format is changed from the default format to the special format. The RE word is then rendered according to the special format in step 640. Step 640 is described in greater detail below. Step 650 then changes the current rendering format back to the default format.

If the current word is not tagged with a special format, the method 600 proceeds to step 660, which renders the current RE word according to the default format. Step 660 is described in more detail below.

If the current word is tagged as unencoded (SE), the unencoded SE word at step 670 is rendered in conventional fashion according to the default format. The method 600 concludes at step 680 after step 650, step 660, or step 670.

Figure 8:
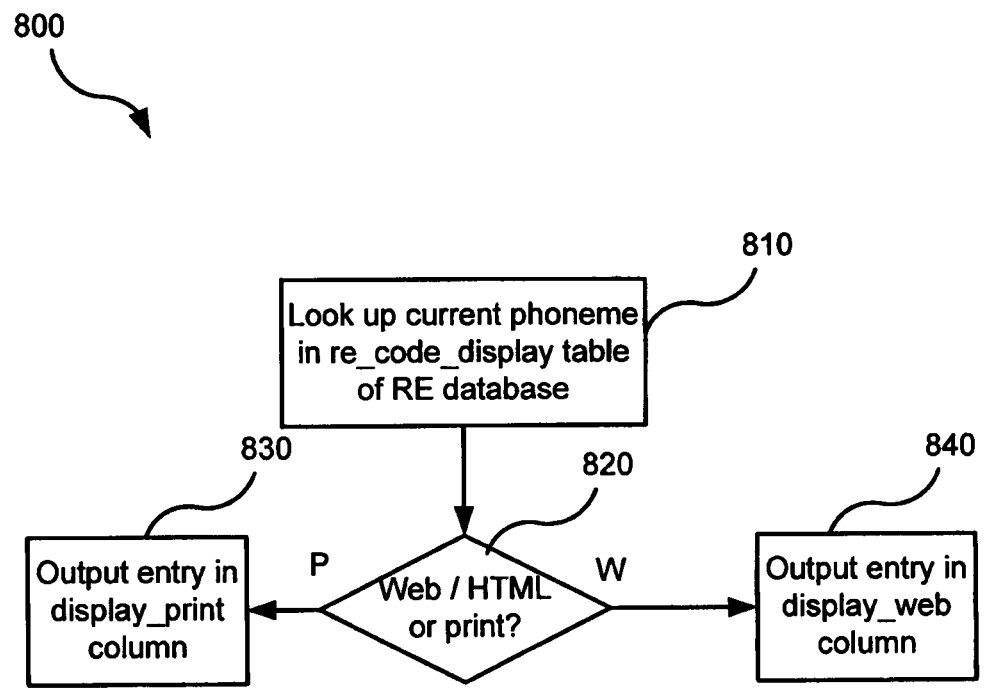
FIG. 8 is a flow chart representing a method of rendering an RE word in an RE-encoded document, as used in the method of FIG. 6.

FIG. 8 is a flow chart representing a method 800 of rendering an RE word in an RE-encoded document, as used in steps 640 and 660 of the method 600 of FIG. 6. The method 800 is carried out for each encoded phoneme in the RE word to be rendered in succession. Note that the method 800 also renders the syllable breaks between syllables in the RE encoded document in the appropriate places. The re_misc_display table 460 controls how syllable breaks are rendered, e.g. as hyphens, dots, short spaces, etc., as well as how words tagged with a "special format" are rendered. Examples of special formats are smaller font, different colour, surrounding by parentheses, or some combination of these.

The method 800 starts at step 810, which looks up the row in the re_code_display table 450 corresponding to the current encoded phoneme. The default re_code_display table and re_misc_display table 460 are included in every RE-encoded document as part of the encoding process 140. However, if the rendering device 701 contains a customised re_code_display table 450 or re_misc_display table 460, the customised table is used by the method 800 in preference to the re_code_display table or remise display table included in the RE-encoded document.

The following step 820 determines whether the rendering is to web/HTML output or printed output. If the rendering is to printed output, step 830 outputs the entry in the display_print column of the corresponding row looked up in step 810 to the output rendered document. If the rendering is to Web/HTML output, step 840 outputs the entry entry in the display_web column of the corresponding row looked up in step 810 to the output rendered document. The method 800 then concludes.

An enhanced RE-encoded document 160 also contains supplementary information, i.e. portions of the RE database 150 relevant to the RE words in the document 160. The choice of supplementary information may be made by the user of the rendering device 701 as part of a purchasing request for the RE-encoded document 160. The supplementary information for each unique RE word in the enhanced RE-encoded document 160, which was extracted from the RE database 150 and added to the RE-encoded document 160 in step 370 of the encoding method 300, may include one or more of the following:

- The definition of the word, extracted from the table en_definition 480;
- The audio representation of the word, extracted from the table re_media 470.
- The video representation of the word, extracted from the table re_media 470.
- The stress indication of the word, extracted from the table re_words 420.

In a variant implementation of the rendering method 800, suitable for when the stress indications associated with each RE encoded word are stored in the enhanced RE encoded document 160 as part of the supplementary information, the stress indications associated with each word are used to render the stressed syllable(s) in the rendered word differently from the other syllables in that word as governed by the table re_misc_display 460, e.g. in bold typeface. However, the present inventors have found that correct syllable breaks and phonetic encoding make the use of such stress indications largely unnecessary. For example, the two words "contract" (noun) and "contract" (verb) have different stress patterns, but with the aid of their respective RE encodings (c1o1n1-t1r1a1c1t1 and c1o3n1-t1r1a1c1t1) a reader will tend to pronounce each word with the correct emphasis anyway.

A user may also request a "foreign language" version of the RE-encoded document 160, in one of a predetermined set of languages supported by the RE database 150. For such a "foreign language" version, the supplementary information may include, in addition to the above-mentioned information, one or more of:

- The translation of each RE word into the foreign language, extracted from the table translation 495;
- The foreign-language-specific phonetic representation of the RE word, obtained using the corresponding foreign-language representation of each RE syllable in the RE word obtained from the table re_syllables 430.

In one implementation, users purchase RE-encoded documents 160 from a website by selecting the document 160, selecting a legibility-aiding format (e.g. large-print) if desired, requesting any supplementary information, paying, and downloading. The purchase price of the selected RE-encoded document 160 depends in part on the amount of supplementary information requested.

The same scheme can also be used for loans of RE-encoded documents 160. Readers log onto the library site, select an RE-encoded document 160 to borrow, select a format, request any supplementary information, and download. When the reader has read the book, or after a predetermined interval, the RE-encoded document 160 that they have borrowed is simply deleted from their reading device. The RE-encoded document 160 is then available for borrowing by another reader.

Figure 9:
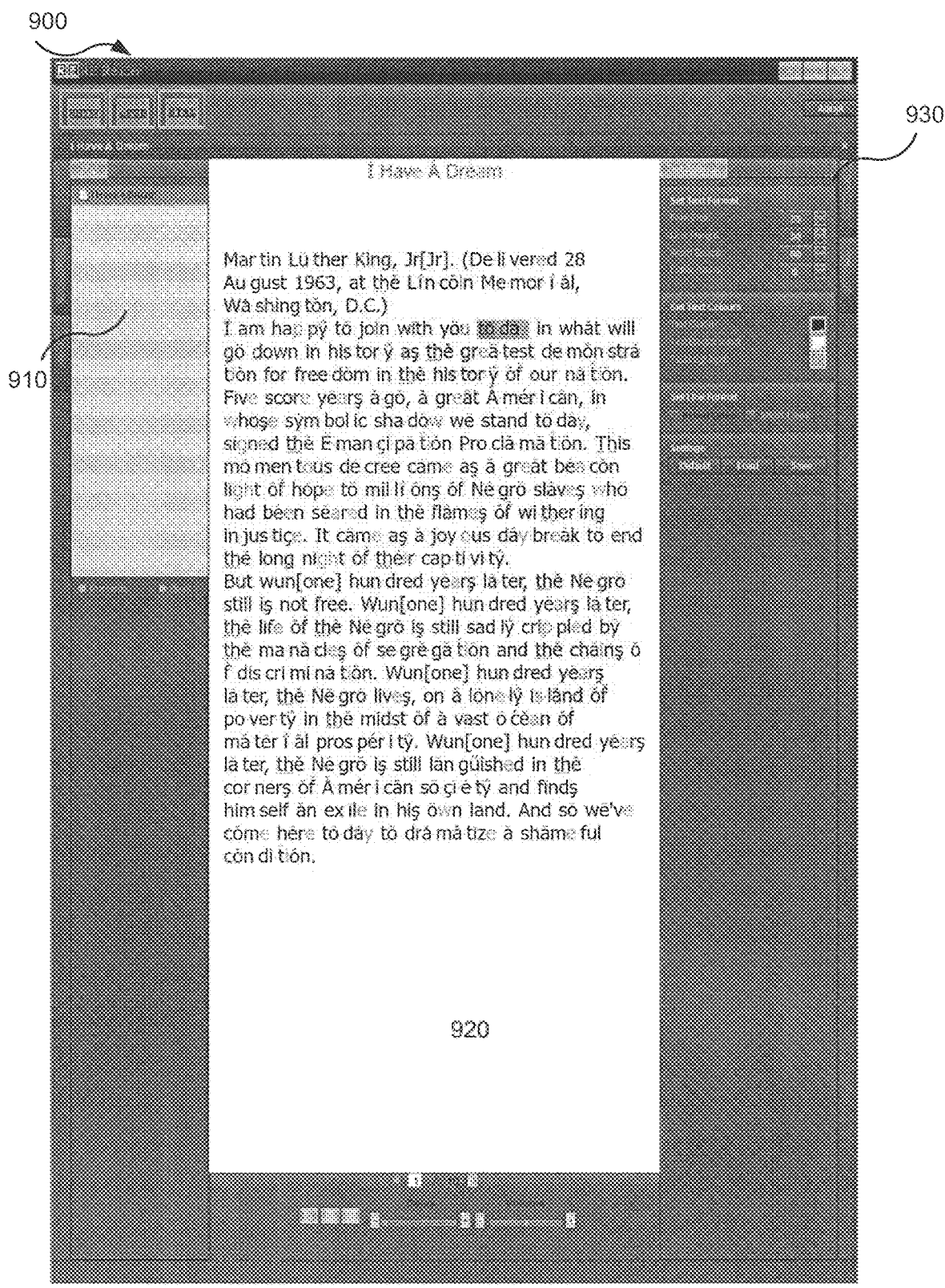
FIG. 9 illustrates the main window of the display of the rendering device of FIG. 7 having rendered an RE-encoded document to a rendered RE document for display according to one embodiment.

As part of the graphical user interface of the rendering device 701, the rendering device 701 is configured to receive commands from the user via the user input device 713 when an RE-encoded document 160 is rendered to a rendered RE document 180 for display on the display 714 of the rendering device 701. FIG. 9 illustrates the main window 900 of the display 714 of the rendering device 701 having rendered an RE-encoded document 160 to a rendered RE document 180 for display according to one embodiment. The main window 900 includes a navigation portion 910, a display portion 920, and a settings portion 930. The navigation portion 910 allows the user to navigate between and between rendered RE documents and thereby alter the portion of the rendered RE document 180 currently displayed in the display portion 920. The settings portion allows the user to alter the settings of the rendering device 701 and thereby alter how the current portion of the rendered RE document 180 is displayed in the display portion 920. For example, the settings portion 930 contains controls to alter the font size, line height, letter spacing, word spacing, text colour, background colour, and "highlight colour" in the display portion 920. In one implementation, the settings portion 930 also contains a control (not shown) to alter the size of the diacritical marks that form part of the rendered RE phonemes in the default representation, as explained below. The smaller these marks, the more closely the rendered RE resembles standard English.

Figure 10:
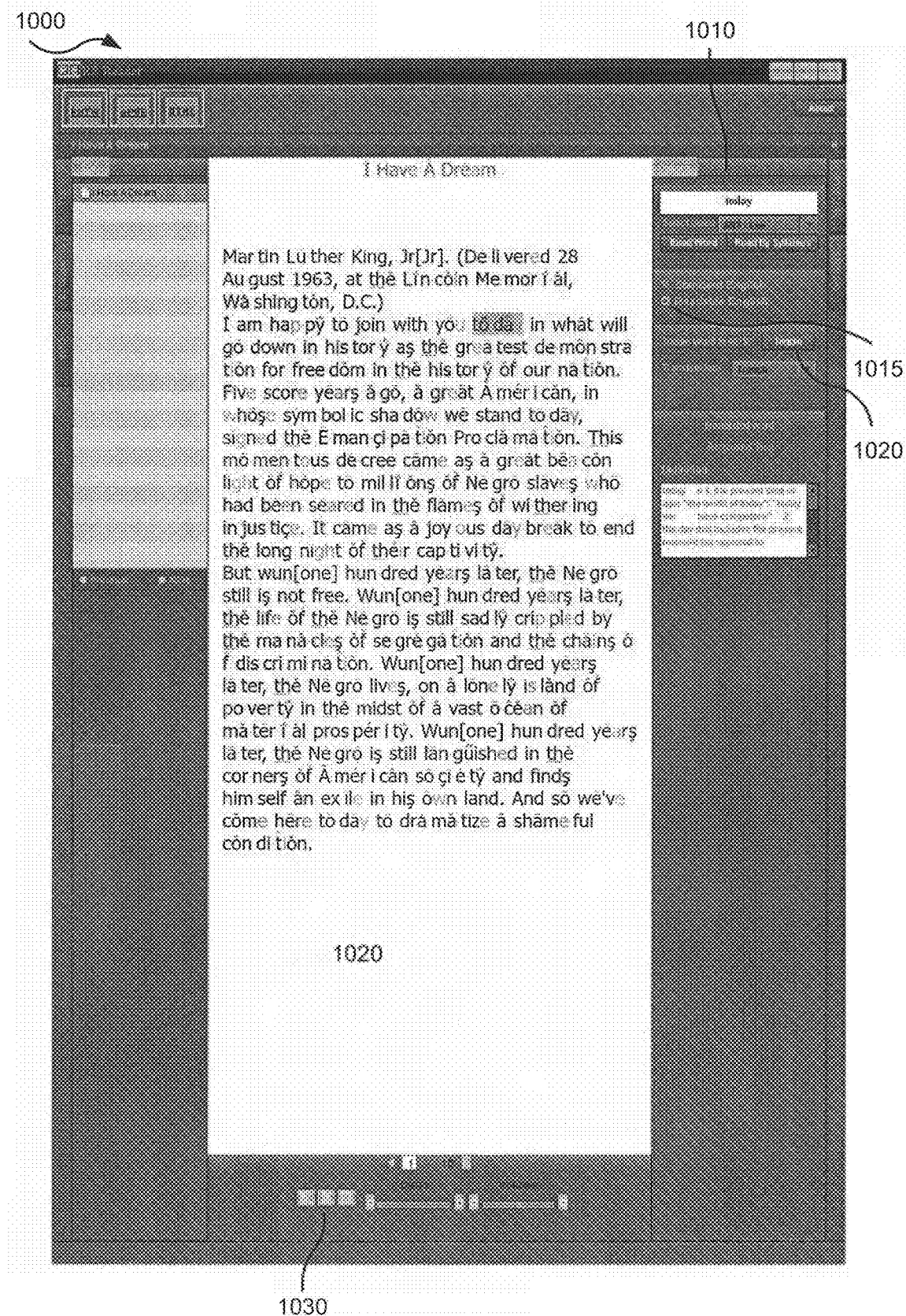
FIG. 10 illustrates the main window of the display of the rendering device of FIG. 7 having rendered an enhanced RE-encoded document to a rendered RE document for display according to one embodiment.

FIG. 10 illustrates the main window 1000 of the display 714 of the rendering device 701 having rendered an enhanced RE-encoded document 160 for display according to one embodiment. The main window 1000 includes an options portion 1010. The user can activate a control 1015 in the options portion 1010 to cause either the the original SE text or the rendered RE text to be displayed. In one implementation, the options portion 1010 also contains a control (not shown) to allow an entire class of words, such as all proper names, to be displayed as SE or rendered RE. In a further implementation, the options portion 1010 also contains a control (not shown) to alter the formatting of the rendered words depending on their part of speech, e.g. different colours for nouns, verbs etc.

The input device 713 allows the user to select a rendered RE word, e.g. by hovering a cursor over, or touching in the case of a touch screen, the rendered word. The options portion 1010 contains a control 1020 to toggle between displaying the selected word as SE and displaying it as rendered RE. In response to the selection of a rendered word, the rendering device 701 extracts the supplementary information related to the selected word from the enhanced RE-encoded document 160 and displays the supplementary information in the options portion 1010. For example, in FIG. 10 the currently selected word "today" is highlighted in the display portion 1020 of the window 1000 using the above mentioned "highlight colour". The currently selected word and the supplementary information relating to the currently selected word are displayed in the options portion 1010, for example, the definition(s) of the word and its translation into a selected foreign language (in this case French). In addition, the audio portion of the supplementary information is spoken by an RE-enabled speech synthesiser, either as a whole word, or broken down by syllables, on selection of the corresponding control ("Read Word" or "Read by Syllables"). This functionality further enhances the readability of the rendered RE document 180, by enabling a user to clarify the meaning or pronunciation of an unfamiliar word.

The playback controls 1030 at the bottom of the window 1000 control the continuous rendering of the audio portion of the supplementary information by the RE-enabled speech synthesiser. The user can control the spacing between audio renderings of words and the volume of the rendering by selecting an appropriate control.

An enhanced RE-encoded document 160 may also include a document in standard English explaining how to read and use RE, and a list of all the RE phonemes with their pronunciations. An enhanced RE-encoded document 160 may also include an audio rendering of the complete document into natural-sounding English speech produced by a speech synthesiser, in an accent of the reader's choice.

The entries in the default_elec and default_print columns in the re_code_display table 450 are all taken from the Unicode character set, to ensure that all Unicode-capable devices can render RE by default. The default_elec and default_print column entry for each RE phoneme is derived by adding visual cues (usually diacritical marks) to the base grapheme for the RE phoneme, i.e. the grapheme corresponding to the row of Table 1 and Table 2 in which the RE phoneme is found. The added visual cues are adapted to indicate the pronunciation of the phoneme as a variant of the pronunciation of the base grapheme. For example, as shown in Table 6, the default electronic representation of the RE phoneme "e2" (long "e"), which is found in the row of Table 1 corresponding to the grapheme "e", is "ē" (Unicode character 0113), with the overbar indicating that the base vowel sound is to be "extended". Likewise, the default electronic representation of the RE phoneme "e3" (schwa "e"), also found in the row of Table 1 corresponding to the grapheme "e", is "ĕ" (Unicode character 0115), with the superposed u-shaped breve indicating that the base vowel sound is to be "neutralised" as "uh".

The default representations of the "silent" RE phonemes, i.e. column 9 of Table 1 and column 9 of Table 2, are chosen to indicate that the phoneme is not pronounced. In one implementation, as shown in Table 1, this indication is achieved by a "greying out" of the base grapheme associated with the silent phoneme. For example, the default electronic representation of the RE phoneme "e" (silent "e"), which is found in column 9 of the row of Table 1 corresponding to the grapheme "e", is a greyed-out version of the base grapheme, i.e. a greyed-out "e". In other implementations, the default representation is an "outline" version of the base grapheme or a "strikethrough" version of the base grapheme. The default representations of the silent phonemes are preferably chosen to allow rendered RE text to be "cut and pasted" while maintaining the appearance of the "silent" phonemes.

Table 7 contains the default representations of the RE phonemes from the default_elec and default_print columns in the re_code_display table 450. Table 7 is shown in FIG. 11.

Each added visual cue has been given a name that has been chosen to make the visual cue easier to remember. Those names are then suffixed to the name of the base grapheme to make a memorable name for each RE phoneme. The names of the cues that are applied to more than one base grapheme are as follows:

"Top line" indicates the "long" vowel sounds in column 2, so that "a2" is named "a top line".

"Upper cup" indicates the "schwa" vowel sounds in column 3, so that "a3" is named "a upper cup".

"Top dot" indicates the "i"-like vowel sounds in column 4, so that "a4" is named "a top dot".

"Top dot dot" indicates the "oo"-like vowel sounds in column 5, so that "o4" is named "o top dot dot".

"face" indicates the "long-e"-like vowel sounds in column 6, son that "i6" is named "i face".

"squiggle" indicates the "short oo"-like vowel sounds in column 6, son that "o6" is named "o squiggle".

"top hat" indicates the "aspiration" of the consonant sounds in column 3, so that "c3" is named "c top hat".

Some of the default representations in Table 7 are not single Unicode characters. Instead, they are obtained using Unicode "combining characters", which are special characters that are rendered as a modification of a "main" character immediately preceding the combining character. For example, the default representation of RE phoneme a7 is Unicode character 0061 ("a") followed by Unicode combining character 036C (a small superscribed "r").

As a result of the derivation of the default representations of RE phonemes, default-rendered RE substantially preserves the shape or spelling of the original SE to which it is phonetically equivalent. This is because most of the rendered RE words use the same base graphemes as the original SE words, while using syllable breaks and visual cues to assist the phonetic decoding.

Consequently, over time, readers of default-rendered RE develop "sight word recognition" of non-phonetic words and can therefore recognise the equivalent SE words, which have substantially the same shape. In this way, default-rendered RE acts as an intermediate format adapted to assist people to learn to read SE text. In addition, proficient readers of SE can easily read default-rendered RE, because the similarity in shape of default-rendered RE words to the familiar, equivalent SE words allows their sight-word recognition skills to work effectively.

However, the RE-encoded words input-classified as "X" cannot be rendered so as to substantially preserve the spelling of the source SE words, because at least one syllable of an "X"-classified RE-encoded word comprises RE phonemes whose corresponding base graphemes do not spell the corresponding SE syllable. This is the reason for the dual-encoding of X-classified words as mentioned above with reference to step 360. The result of the method 800 is that X-classified words are rendered in the original SE with an RE equivalent word rendered in a special format immediately afterwards. With the RE phoneme set as defined in Table 1 and Table 2 above, it is estimated that only 1% of standard English words are classified as "X", but many common words such as "one" fall into this input classification.

The number of "X"-classified, dual-encoded words may be reduced by increasing the size of the RE phoneme set.

However, as mentioned above, such action goes against the goal of ensuring rendered RE is readily learnable.

Appendix B contains a sample of rendered RE for the opening sections of the "I have a dream" speech of the Rev. Dr Martin Luther King, Jr, the first sentence of which appears in Appendix A in RE-encoded form. In Appendix B, syllable breaks are rendered as mid-line dots (•), and the special format of "X"-classified words (such as "one" in the middle of the third paragraph) is a surrounding by square brackets ([ ]). Silent phonemes, such as the final "e" in "five" on the first line of the second paragraph, are represented in grey text.

The arrangements described are applicable to the publishing industries.

The foregoing describes only some embodiments of the present invention, and modifications and/or changes can be made thereto without departing from the scope and spirit of the invention, the embodiments being illustrative and not restrictive.

APPENDIX A

<upara>
  <sen>
    <line indent="1">I2 a1m1 h1a1p9•p1y6 t1o5 j1o1i1n1 w1i1t1h1 y1o5u9
t1o•5d1a2y9 i1n1 w1h9a3t1 w1i1l1l1 g1o2 d1o1w1n1 i1n1
h1i1•s1t1o1r1•y6</line>
<line indent="2">a1s2 t2h2e3 g1r1e9a2•t1e1s1t1
d1e1•m1o3n1•s1t1r1a2•t3i9o3n1 f1o1r1 f1r1e2e9•d1o3m1 i1n1 t2h2e3
h1i1•s1t1o1r1•y6 o3f2
o1u1r1 n1a2t3i9o3n1.</line>
</sen>
</upara>

APPENDIX B

I am happy to join with you today in what will go down in history as the greatest demonstration for freedom in the history of our nation.

Five score years ago, a great American, in whose symbolic shadow we stand today, signed the Emancipation Proclamation. This momentous decree came as a great beacon light of hope to millions of Negro slaves who had been seared in the flames of withering injustice. It came as a joyous daybreak to end the long night of their captivity.

But one hundred years later, the Negro still is not free. One hundred years later, the life of the Negro is still sadly crippled by the manacles of segregation and the chains of discrimination. One hundred years later, the Negro lives on a lonely island of poverty in the midst of a vast ocean of material prosperity. One hundred years later, the Negro is still languished in the corners of American society and finds himself an exile in his own land. And so we've come here today to dramatize a shameful condition.

The invention claimed is:

1. A method of phonetically encoding a text document, the method comprising:

recognizing a current word in a source text document, the current word having multiple syllables, each syllable including a sequence of base graphemes, at least one of the base graphemes in the current word being a silent grapheme that is not pronounced when the current word is spoken;

replacing the current word with a phonetically encoded word to thereby create a phonetically encoded text document in human-readable form, including:

for each of the syllables of the current word, replacing each of the silent graphemes with a deemphasized grapheme having a diminished appearance to thereby signify it is not pronounced, and replacing the other base graphemes in the sequence with phonemically encoded graphemes from a predetermined phoneme set, so that the resulting phonetically encoded word has the same number of graphemes as the number of base graphemes in the current word, each of the phonemically encoded graphemes including the corresponding base grapheme of the current word, and at least some of the phonemically encoded graphemes further including a diacritical mark that does not obscure visual recognition of the base grapheme, thereby preserving the visual structural appearance of the current word to facilitate development of sight word recognition by a human reader, and wherein each of the phonemically encoded graphemes of the predetermined phoneme set represents either a single basic phoneme or a single non-basic phoneme, but not both, and the phoneme set includes a subset of homophonic phonemically encoded graphemes, each of the homophonic phonemically encoded graphemes of the subset includes a different base grapheme, and at least some of the homophonic phonemically encoded graphemes of the subset include a common diacritical mark; and outputting the phonetically encoded text document in human-readable form.

2. The method of claim 1, further comprising adding a syllable break glyph between adjacent syllables of the current word.

3. The method of claim 1, further comprising:

classifying each of multiple words of the source text document in one of two or more classifications including a first classification and a second classification, the classifying being based on the number of syllables and non-basic phonemes in the word;

leaving the visual structural appearance of words of the first classification unchanged and without any added diacritical marks; and replacing each of the words of the second classification with an equivalent phonetically encoded word including at least one syllable break glyph between adjacent syllables and at least one phonemically encoded grapheme having a diacritical mark.

4. The method of claim 1, further comprising:

classifying each of multiple words of the source text document in one of two or more classifications including a first classification and a second classification, the classifying being based on the number of syllables and non-basic phonemes in the word;

detecting whether a control option has been activated; and upon detecting the control option is not active, outputting the phonetically encoded document with words of the first and second classifications replaced by phonetically encoded words, at least some of the phonetically encoded words including at least one phonemically encoded grapheme having a diacritical mark and at least some of the phonetically encoded words including both a syllable break glyph between adjacent syllables and at least one phonemically encoded grapheme having a diacritical mark, and upon detecting the control option is active, leaving the visual structural appearance of words of the first classification unchanged and without any added diacritical marks, and outputting the phonetically encoded document with words of the second classification replaced by an equivalent phonetically encoded word including at least one syllable break glyph between adjacent syllables and at least one phonemically encoded grapheme having a diacritical mark.

5. The method of claim 4, wherein the control option can be selectively activated by the human reader.

6. The method of claim 1, wherein all subsets of homophonic phonemically encoded graphemes in the predetermined phoneme set consist of phonemically encoded graphemes having different basic graphemes with the same diacritical mark or no diacritical mark.

7. The method of claim 1, wherein the deemphasized grapheme is a greyed-out version of the corresponding base grapheme.

8. The method of claim 1, wherein the base grapheme is an outline version of the corresponding base grapheme.

9. The method of claim 1, further comprising providing a different memorable name for each different diacritical mark of the predetermined phoneme set and for the common diacritical mark of the subset of homophonic phonemically encoded graphemes.

10. The method of claim 1, further comprising:
recognizing a non-phonetic exception word in the source text document that cannot be mapped to a sequence of the phonemically encoded graphemes having the same basic graphemes as the exception word; and
displaying a phonetically equivalent encoded word adjacent the exception word in the phonetically encoded document, the phonetically equivalent encoded word being tagged to signal to the reader that the exception word is non-phonetic.

11. The method of claim 1, wherein:
the current word includes basic phonemes and non-basic phonemes, and each of the basic phonemes and non-basic phonemes are represented in the current word by one or more basic graphemes; and
replacing the current word with a phonetically encoded word includes:
for each of the non-basic phonemes, replacing each basic grapheme of the non-basic phoneme with either a phonemically encoded grapheme comprising the basic grapheme with an added diacritical mark, or a deemphasized grapheme comprising the basic grapheme with a diminished appearance, or both, and
for each of the basic phonemes, leaving the visual structural appearance of the corresponding basic grapheme of the basic phoneme unchanged in the phonetically encoded word.

12. The method of claim 1, wherein the phonetically encoded document further comprises supplementary information associated with the phonetically encoded word, wherein the supplementary information includes one or more of the group consisting of:
a definition of the current word;
an audio representation of the pronunciation of the current word;
a video representation of the pronunciation of the current word;
a translation of the current word into a language that is different from the language of the source text document;
a phonetic representation of the word in the different language; and
an indication of which syllable(s) are stressed in the word.

13. A system for phonetically encoding a text document, the system comprising:
a memory;
an output device; and
a processor in communication with the output device and the memory, the processor operable to execute instructions stored in the memory, the memory storing instructions that cause the processor to:
recognize a current word in a source text document, the current word having multiple syllables, each syllable including a sequence of base graphemes, at least one of the base graphemes in the current word being a silent grapheme that is not pronounced when the current word is spoken;
replace the current word with a phonetically encoded word to thereby create a phonetically encoded text document in human-readable form, including:
for each of the syllables of the current word, replacing each of the silent graphemes with a deemphasized grapheme having a diminished appearance to thereby signify it is not pronounced, and replacing the other base graphemes in the sequence with phonemically encoded graphemes from a predetermined phoneme set, so that the resulting phonetically encoded word has the same number of graphemes as the number of base graphemes in the current word, each of the phonemically encoded graphemes including the corresponding base grapheme of the current word, and at least some of the phonemically encoded graphemes further including a diacritical mark that does not obscure visual recognition of the base grapheme, thereby preserving the visual structural appearance of the current word to facilitate development of sight word recognition by a human reader, and
wherein each of the phonemically encoded graphemes of the predetermined phoneme set represents either a single basic phoneme or a single non-basic phoneme, but not both, and the phoneme set includes a subset of homophonic phonemically encoded graphemes, each of the homophonic phonemically encoded graphemes in the subset includes a different base grapheme, and at least some of the phonemically encoded graphemes in the subset include a common diacritical mark; and
output the phonetically encoded text document to the output device in human-readable form.

14. The system of claim 13, wherein the memory further stores instructions that cause the processor to add a syllable break glyph between adjacent syllables of the current word.

15. The system of claim 13, wherein each of multiple words of the source text document are classified, based on the number of syllables and non-basic phonemes in the word, in one of two or more classifications including a first classification and a second classification; and
the instructions further cause the processor to:
leave the visual structural appearance of words of the first classification unchanged and without any added diacritical marks; and
replace each of the words of the second classification with an equivalent phonetically encoded word including at least one syllable break glyph between adjacent syllables and at least one phonemically encoded grapheme having a diacritical mark.

16. The system of claim 13, wherein each of multiple words of the source text document are classified, based on the number of syllables and non-basic phonemes in the word, in one of two or more classifications including a first classification and a second classification; and the instructions further cause the processor to:

detect whether a control option has been activated; and upon detecting the control option is not active, outputting the phonetically encoded document to the output device with words of the first and second classifications replaced by phonetically encoded words, at least some of the phonetically encoded words including at least one phonemically encoded grapheme having a diacritical mark, and at least some of the phonetically encoded words including both a syllable break glyph between adjacent syllables and at least one phonemically encoded grapheme having a diacritical mark, and upon detecting the control option is active, leaving the visual structural appearance of words of the first classification unchanged and without any added diacritical marks, and outputting the phonetically encoded document to the output device with words of the second classification replaced by an equivalent phonetically encoded word including at least one syllable break glyph between adjacent syllables and at least one phonemically encoded grapheme having a diacritical mark.

17. The system of claim 13, wherein the output device includes a printer.

18. The system of claim 13, wherein the output device includes a display device.

* * * * *